(12) United States Patent
Hwu et al.

(10) Patent No.: US 10,397,345 B2
(45) Date of Patent: Aug. 27, 2019

(54) LOCATION-BASED ASSET SHARING

(71) Applicant: Adobe Inc., San Jose, CA (US)

(72) Inventors: David Chung Wu Hwu, Daly City, CA (US); Dejan Markovic, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 527 days.

(21) Appl. No.: 13/972,484

(22) Filed: Aug. 21, 2013

(65) Prior Publication Data
US 2015/0058749 A1 Feb. 26, 2015

(51) Int. Cl.
G06F 3/048 (2013.01)
H04L 29/08 (2006.01)

(52) U.S. Cl.
CPC .................................. H04L 67/18 (2013.01)

(58) Field of Classification Search
CPC ............ G06F 3/0481; G06F 17/30873; G06F 3/0484; G06F 17/30867; H04L 67/18
USPC .......................... 715/746, 738, 743–745, 753
See application file for complete search history.

(56) References Cited

U.S. PATENT DOCUMENTS

| | | | |
|---|---|---|---|
| 2002/0055972 A1* | 5/2002 | Weinman, Jr. | 709/203 |
| 2005/0289469 A1* | 12/2005 | Chandler et al. | 715/745 |
| 2006/0236257 A1* | 10/2006 | Othmer | G06Q 30/0243 715/774 |
| 2009/0205026 A1* | 8/2009 | Haff | H04L 29/06 726/5 |
| 2011/0173545 A1* | 7/2011 | Meola | 715/743 |
| 2012/0047208 A1* | 2/2012 | Kwon et al. | 709/204 |
| 2013/0061156 A1* | 3/2013 | Olsen et al. | 715/753 |
| 2013/0104251 A1* | 4/2013 | Moore | G06F 21/602 726/30 |
| 2014/0136985 A1* | 5/2014 | Albir et al. | 715/748 |
| 2015/0005010 A1* | 1/2015 | Zhang | H04W 4/023 455/456.3 |

* cited by examiner

*Primary Examiner* — Anil N Kumar
(74) *Attorney, Agent, or Firm* — Kilpatrick Townsend & Stockton LLP

(57) ABSTRACT

Methods and systems for location-based asset sharing are provided. In an embodiment, a method stores a publication in a data store accessible by a server system, the publication including a publication location and a distance restriction. The method receives a request for the asset and then determines, by the server system, to provide the asset in response to the request. The determining is based on a requesting location associated with the request, the publication location, and the distance restriction, wherein according to the distance restriction, the asset is only provided to the requesting location if a distance from the requesting location to the publication location satisfies a specified relationship. The method provides the asset in response to the request. In another embodiment, the publication includes references to one or more assets being shared by a publisher. Another method creates an asset-listener association in response to a received asset association request.

1 Claim, 9 Drawing Sheets

LOCATION-BASED ASSET SHARING

TECHNICAL FIELD

This disclosure relates generally to computer-implemented methods and systems for sharing electronic content and more particularly relates to location-based sharing of electronic assets such as documents, files, and other electronic content.

BACKGROUND

Users in networked, mobile computing environments may wish to make documents or other electronic content accessible to other users in certain locations. For example, a lecturer giving a presentation at a meeting, class, conference, or trade show may wish to share documents such as presentation slides and materials, product brochures, and/or the lecturer's contact information with attendees during the presentation.

Despite advances in mobile technology, mobile computing devices (i.e., 'mobile devices') such as smartphones and tablet devices typically have greater limitations on display size, networkability and memory, data storage, and central processing unit (CPU) capacities than desktop and server computers. While the relatively small size of mobile devices aids in portability and collaboration with other users, the relative lack of storage capacity on some mobile devices can be a hindrance for users who need to share electronic assets such as files, documents, and multimedia content. For example, some mobile devices lack sufficient storage space to locally store electronic assets to be shared with other devices. Given the versatility of mobile devices, it is desired to implement a means by which these devices can quickly share and access electronic content in the context of potentially intermittent, unreliable, occasionally-connected, variable speed (quality of service), or temporarily-unavailable networking capabilities.

Traditional document sharing techniques require multiple, manual steps. Current solutions typically require a user to manually upload or transfer documents to a network-accessible storage device, such as cloud-based storage, via a network, such as the Internet, a wide area network (WAN), or a local area network (LAN). Such solutions often require the user to establish access rules and restrictions for the uploaded documents. Other users wishing to view the documents must subsequently access the storage device (i.e., by logging in to a server), select documents, and then download the selected documents to their respective computing devices.

SUMMARY

In one embodiment, a method includes storing a publication in a data store accessible by a server system, where the publication includes a publication location and a distance restriction. The method receives a request for the asset. The embodiment involves determining, by the server system, to provide the asset in response to the request. The determining is based on a requesting location associated with the request, the publication location, and the distance restriction, wherein according to the distance restriction, the asset is only provided to the requesting location if a distance from the requesting location to the publication location satisfies a specified relationship. After determining to provide the asset in response to the request, the method provides the asset in response to the request.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
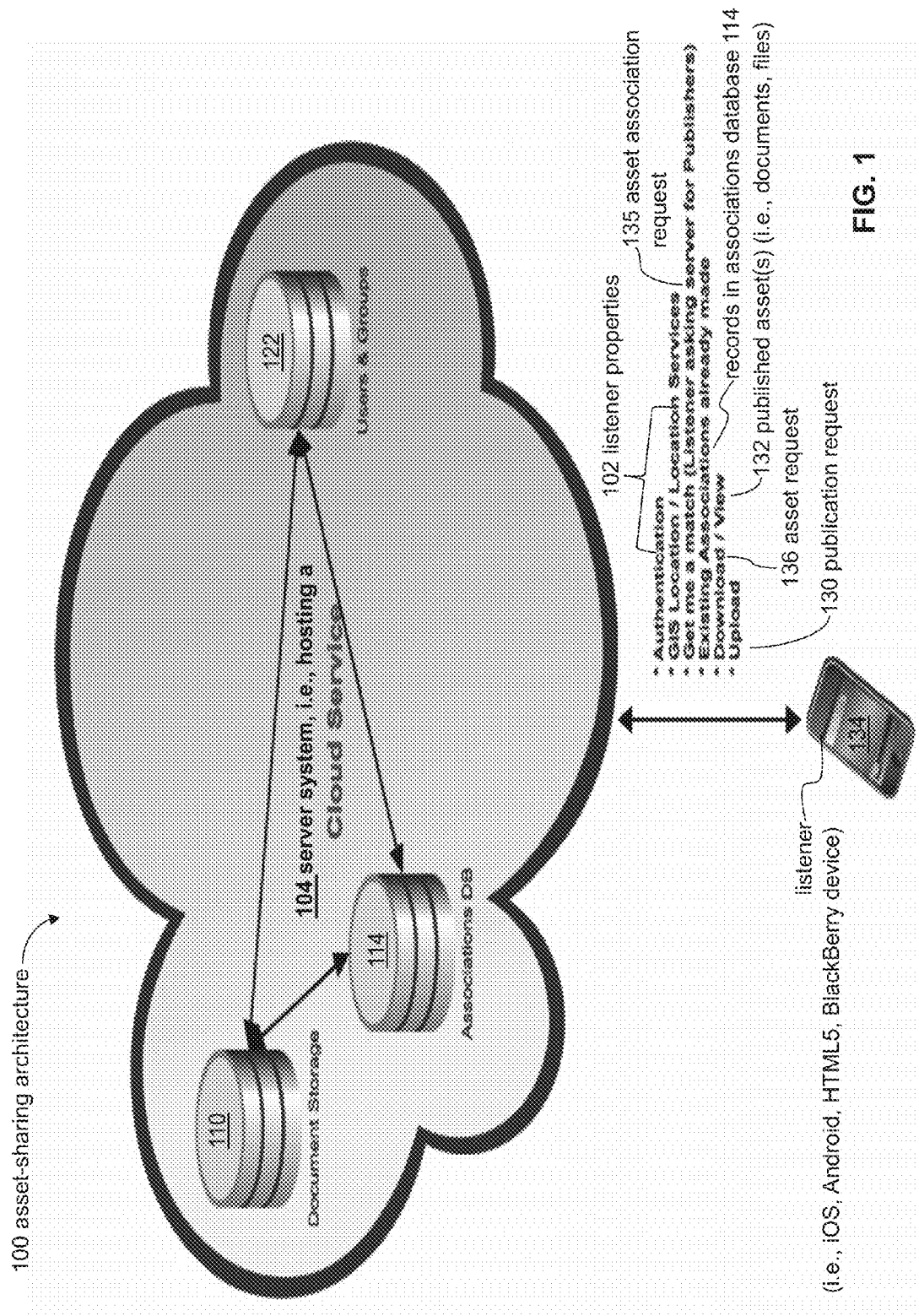
FIG. 1 is a diagram depicting a high level architecture for a location-based asset sharing system, in accordance with embodiments.

Methods and systems are disclosed for location-based file sharing based on geographic locations of mobile devices. The methods and systems use a loud-based service to facilitate location-based file sharing amongst users at a location. The systems and methods facilitate location-based sharing of large amounts of data by providing cloud-based storage for the data and allowing the data to be accessed within a defined location or area. Embodiments allow authors to manage and control discover-ability and publication criteria for electronic documents they wish to share with users at a location. Exemplary systems and methods enable authors and publisher users to share their documents with any listener computing device in a desired vicinity via a streamlined publishing workflow. An example publishing workflow requires only two inputs (i.e., 2 clicks or selections) from a publisher user in order to enable location-based sharing for an electronic asset. Embodiments provide a publisher user interface (UI) so that publisher users can define the scope of their location sharing along with constraints as to groups and users they wish to publish to (i.e., share assets with). In certain embodiments, all shared assets are stored in asset storage on a server hosting a cloud service and delivered to a desired client end-point (i.e., a listener device) after a handshake association is made between the publisher device and the listener device.

Exemplary methods allow users to share files and other electronic assets, such as, but not limited to, documents, database objects, web pages, hosted software applications, hosted services, online meetings, webinars, podcasts, videoconferences, shared desktops, learning management systems, computing system resources, network-accessible storage devices, file systems, streaming media, menus, deal-of-the-day offers, discount codes, and interactive whiteboards, and graphical objects. The electronic assets can be stored in network data servers, file servers, database servers, cloud storage, application servers, and web servers. Application servers can include servers hosting learning management systems, database management systems, and servers hosting applications provided via a cloud service. Sharing electronic assets with multiple devices at a location may require quickly determining if devices and/or users associated with the devices are authorized to access the documents. The locations of such users can be based on locations of various mobile devices such as smartphones, tablet devices, and notebook or laptop computers associated with the users. The methods and systems facilitate location-based asset sharing amongst computing devices via a cloud-based service.

Many mobile operating systems and platforms, such as the iOS operating system (OS) developed by Apple Inc., the Android platform from Google Inc., the Microsoft Windows® 8 OS, the Microsoft Windows® Phone OS, the Symbian OS, the Blackberry OS from Research In Motion (RIM) and similar operating systems include a location service, a geographic information system (GIS), or an application programming interface (API) that can be used to determine a geographic location of a mobile device. For example, a mobile listener device configured to discover shared assets in its vicinity can provide its current location as a Global Positioning System (GPS) location from its location service or a GIS. Similarly, a mobile publisher device configured to share assets can provide its GPS location from its location service or a GIS as a publication location.

In an embodiment, a method receives, at a server system, a publication request, where the publication request includes references to one or more assets to be shared by a publisher, a publication location, and a distance restriction for the one or more assets. The embodiment involves creating a publication, where the publication includes the references, the publication location, and information identifying the publisher. The embodiment stores the publication in a data store accessible by the server system. The method receives a request for an asset of the one or more assets, where the request indicates a requesting location. The method includes determining, by the server system, whether to provide the asset in response to the request. The determining is based on the requesting location, the publication location, and the distance restriction. In accordance with the distance restriction, the asset is only provided to the requesting location if a distance from the requesting location to the publication location satisfies a specified relationship. In response to determining that the distance from the requesting location to the publication location satisfies the specified relationship, the method provides the requested asset.

In another embodiment, a computer readable storage medium has executable instructions stored thereon, that if executed by a processor of a server hosting a cloud-based service, cause the processor to perform operations for creating a publication for an asset. The instructions comprise instructions for receiving a publication request including an uploaded copy of an asset to be shared by a publisher, a publication location, and publication criteria for the asset. The computer readable storage medium also has instructions for creating a publication. According to this embodiment, the publication includes a reference to the uploaded copy of the asset, the publication location, the publication criteria, and information identifying the publisher. The instructions further comprise instructions to store the copy of the asset and the publication in a data store accessible by the cloud-based service.

According to another embodiment, a system includes a server having a processor and a memory with instructions stored thereon, that, if executed by the processor, cause the processor to perform operations for creating a publication for a plurality of assets. The operations include receiving a publication request. In this embodiment, the publication request includes references to a plurality of assets to be shared by a publisher, a publication location, and publication criteria for the plurality of assets. The operations also include creating a publication. According to this embodiment, the publication includes the references to the plurality of assets, the publication location, the publication criteria, and information identifying the publisher. The operations further include storing the publication in the memory of the server.

As used herein, the term "publication" is used to refer to information indicating one or more electronic assets to be shared by a publisher, a publication location, and a distance restriction. The publication location can be a geographic location of the publisher or a fixed geographic location selected by the publisher. The distance restriction can be used to restrict access to the one or more assets so that the one or more assets are only provided to a requesting location if a distance from the requesting location to the publication location satisfies a specified relationship. A publication can include references to one or more electronic assets to be shared by a publisher, a publication location for the assets, and a distance restriction for the assets. The references can be network locations, URLs, and/or locations in memory devices accessible by multiple computing devices. The references can be references to locations in a server-based storage device, such as a cloud-based storage device, that provides data storage and/or data transfer services accessible from one or more computing devices. Location-based asset sharing can be performed via interface commands for publishing assets, including commands to transfer copies of published assets such as uploading and/or downloading operations. For example, a cloud service can provide storage for published assets identified in publications so that the published assets that can be accessed from computing devices satisfying a distance restriction in the publication. In some embodiments, a publication corresponds to a single asset to be downloaded and shared between multiple requesting computing devices. For example, a publication can be a copy of an electronic asset to be shared, such as an image file, that includes metadata with a publication location and distance restriction. In other embodiments, a publication can specify multiple assets to be shared along with a common distance restriction for the assets.

As used herein, the term "publisher user" is used to refer to users who designate assets for sharing. Publisher users can designate assets that they have previously uploaded to a server-based cloud service for sharing by marking the uploaded assets for publication. Assets marked for publication by publisher users are shared assets. Publisher users can designate publication criteria for shared assets that they have uploaded and designated.

As used herein, the terms "publisher computing device," "publisher device," and "publisher" are used interchangeably to refer to computing devices associated with publisher users. A user interface (UI) of a publisher device can be used by a publisher user to select assets to be uploaded to a cloud service and to designate previously uploaded assets for publication. A publisher UI can also be used to select a distance restriction and other publication criteria for shared assets.

As used herein, the term "listener user" is used to refer to users who opt-in to a location-based asset sharing cloud service and look for documents within their designated vicinity.

As used herein, the terms "listener computing device," "listener device," and "listener" are used interchangeably to refer to computing devices associated with listener users. Listener devices whose users have opted in to the location-based asset sharing cloud service can send listener properties to the cloud service. For example, listener devices can send their GPS location to the location-based asset sharing cloud service. A user interface (UI) of a listener device can be used by a listener user to select shared assets to be downloaded from a cloud service and to be viewed on the listener device. A listener UI can also be used to send asset association requests and asset requests for shared assets available in the listener's vicinity.

Unless specifically stated differently, a "user" is interchangeably used herein to identify a user account, a human user, or a software agent. Besides human users who publish, upload, request, and download shared assets, a software application or agent sometimes needs to publish and access shared assets such as documents or other electronic content. The systems and methods disclosed herein can use publication criteria that limit access to published assets based on user accounts associated with both human users and software agents. Similarly, the systems and methods disclosed herein are capable of controlling access to published assets based on group membership(s) of a user accounts associated with a human user or software agent. Accordingly, unless specifically stated, the term "user" as used herein does not necessarily pertain to a human being.

As used herein, the term "cloud service" is used to refer to one or more computing resources, including server-based storage, web content, and/or applications, that can be provided as an online service via a data network. The one or more computing resources can be hosted by a plurality of servers and/or a collection of other hardware and can be represented as a single service. The cloud service can provide a digital hub for browsing, creating, sharing, and otherwise using electronic content using one or more applications provided via the cloud service. The server-based storage can comprise one or more cloud storage devices.

As used herein, the term "electronic content" is used to refer to any type of media that can be rendered for display or use at a computing device such as a mobile computing device or another electronic device. Electronic content can include text or multimedia files, such as images, video, audio, or any combination thereof. Electronic content can also include application software that is designed to perform one or more specific tasks at a computing device. Electronic content can also include application software that is designed to perform one or more specific tasks at a computing system or computing device. Computing devices include client and server devices such as, but not limited to, servers, desktop computers, laptop computers, smartphones, video game consoles, smart televisions, tablet computers, portable gaming devices, personal digital assistants (PDAs), etc. Electronic content can be streamed to, downloaded by, and/or uploaded from computing devices. Electronic content can include multimedia hosted on websites, such as Internet web sites, intranet web sites, standard web pages, or mobile web pages specifically formatted for display on mobile computing devices. Electronic content can also include application software developed for computing devices that is designed to perform one or more specific tasks at the computing device.

As used herein, the terms "electronic asset," "asset" and "digital asset" are used interchangeably used to refer to an item of electronic content included in a data object, such as text, images, videos, or audio files. As used herein, the term "image asset" is used to refer to a digital image, vector graphics, raster graphics, etc. As used herein, the term "video asset" is used to refer to a video file included in a multimedia object. As used herein, the term "text asset" is used to refer to text included in a multimedia object.

As used herein, the term "encrypted asset" is used to refer to an asset having undergone an encryption process so that the asset is encoded in such a way that unauthorized third parties, such as eavesdroppers and hackers, cannot read it. An encrypted asset can be a copy of an asset that has been encrypted using an encryption module or application executing an encryption algorithm, thus converting the asset's data into unreadable cipher text. Encrypted assets may be encrypted using an encryption key that specifies how the asset is to be encoded. Encryption keys can be public or private keys usable to encrypt an asset. Encryption keys may be generated by invoking key-generation algorithms to randomly produce keys.

As used herein, the term "decrypted asset" is used to refer to a previously encrypted asset having undergone decryption process to decode the encrypted asset. A decrypted asset can be a copy of the asset produced as a result of the encrypted asset's ciphertext having been decoded using a decryption module or algorithm executing a decryption algorithm. Such decryption modules and applications use a decryption key, which can be a private key that third parties do not have access to. Decryption keys may be generated by invoking key-generation algorithms to randomly produce keys.

An embodiment provides a system for sharing electronic assets between publisher users (i.e., users who have shared their electronic assets) and users of listener computing devices (i.e., listeners) such as smartphones, tablet devices and notebook computers, at a location. The system includes a server hosting a cloud service with a matchmaker module for matching shared assets to listeners that are looking for shared assets based on a geo-location. The system includes a client application executable on client computing devices that renders a user interface (UI) giving users ability to activate and control publisher/listener modes on the client devices. In one embodiment, the UI allows users to express what assets they desire to share or what assets they want to download, link to, or access via two button clicks. Matchmaking performed by an exemplary matchmaker module on the server uses location coordinates provided by GPS-enabled listeners to make a connection during a discovery phase. During the discovery phase, listeners can send their location coordinates (i.e., listener locations) along with other listener properties to the server. Listeners can then submit asset association requests and asset requests to the server. According to an embodiment, once a publisher has approved an asset association request, the server makes logical connections or linkages between shared assets and listeners (i.e., asset-listener associations). In additional or alternative embodiments, associations can be established between publishers and listeners, and publications and listeners. The associations can represent one-to-one (i.e., 1-1), one-to-many (i.e., 1-N), many-to-one (i.e., N-1), and/or many-to-many (i.e., N-N) relationships or linkages. For example, an association can indicate that a publication, publisher, or published asset is associated with one or more listeners. The associations can be stored in an associations database accessible by the server. Once the associations are established, a user can download and view corresponding shared assets immediately on their mobile listener device or access the shared assets at a later time on another device such as a desktop computer. The system provides publisher users with the ability to 'pin' a publication location of certain shared assets to a specific geo-location coordinate. For example, brick and mortar businesses can pin menus, reservation forms, specials, coupons, advertisements and other assets to a publication location corresponding to the geo-location of the brick and mortar establishments. They system enables assets such as product brochures to be made pinnable to trade booths located at convention centers. The system also allows assets such as contracts to be shared, signed, and facilitated by establishing publications for such assets that indicate location restrictions and other publication criteria restricting access to authorized users and groups.

Exemplary methods and systems enable listener users of mobile listener devices to quickly opt-in to a service providing location-based access to electronic assets shared by an author or publisher user. The methods and systems allow a publisher user to establish publications identifying shared assets and including location-based publication criteria useable to restrict access to the assets without requiring a priori knowledge of users and devices that may subsequently request access to the assets. Embodiments also allow other users to efficiently retrieve, render, and display published assets while they are at a given location. Example embodiments allow cross-device sharing of electronic assets based on a publication location selected by a publisher and a geographic location of a mobile device requesting access to the assets. These embodiments allow documents and other electronic assets to be shared with devices at a given location in environments where the types and users of devices at the location are not known in advance.

An embodiment provides a client application executable on a mobile client device such as a smartphone or tablet device. The client application is configured to exchange communications with a server system hosting a cloud service for location-based asset sharing. The client application facilitates a discovery process for discovering published assets available at the current location of the mobile client device. When invoked by a user, the client application renders a UI on a display of the mobile device. The UI is configured to receive input indicating that a user wishes to enable the mobile device to look for published assets available at the user's location. According to embodiments, the input comprises selection of a look for assets UI element, such as a button, link, or icon. In response to receiving such input, the client application activates the mobile device as a listener and transmits listener properties to the server system. The listener properties include a current geographic location of the mobile device (i.e., a listener location). In embodiments, the listener location is a GPS location from a location service or a GIS. The listener properties can also include the user and/or a group associated with the mobile device.

In one embodiment, the client application designates a tunable, preset GPS range usable by the server system to identify shared assets having publication locations within the range. Based on the GPS range, the listener location, and publication locations for shared assets, the server system identifies shared assets the mobile device is eligible to access (i.e., assets available to be downloaded or viewed on the mobile device). In an embodiment, the UI includes a range UI element selectable to increase or decrease the GPS range. For example, when deployed to a mobile device having a touch sensitive display (i.e., a touch screen), the range UI element can be implemented as a slider element (see, e.g., slider 542 in FIG. 5). The client application receives a list of the shared assets within the GPS range from the server and presents the list in the UI. The list includes selectable links or references to the available, shared assets that are within the designated geo-location range. In response to receiving a selection of an asset in the list (i.e., a selection of a link to an asset), the client application downloads and renders the asset on the mobile device's display. In an embodiment, the UI is also configured to receive input indicating that a user wishes to enable a publishing mode, thus activating the mobile device as a publisher. According to this embodiment, the UI includes a publish assets UI element (i.e., a 'publish my files' button, link or icon) and the range UI element is selectable to designate a distance restriction for published assets. In response to detecting selection of the publish assets UI element, the client application renders additional UI elements and objects usable to enter publication criteria. Such publication criteria can include time criteria indicating when a user wishes to share an asset, and access restrictions indicating whom the user wants to share the asset with. The publication criteria include a publication location. In embodiments, the UI allows the user to either set a fixed publication location for an asset by 'pinning' the asset to a specific geographic location, or use the geographic location of the mobile device as the publication location. For example, the publication location can supplied to the server system as the mobile device's GPS location from a location service or a GIS, where the GPS location is determined at the time the asset is uploaded to the server system.

Embodiments disclosed herein provide location-based, cross-device sharing of assets copied to a server-based storage device such as a cloud-based storage device provided as a cloud service. For example, an asset from a first, publishing computing device (i.e., a publisher) may be stored in a cloud storage device with a publication identifying a publication location and a distance restriction, and subsequently transmitted to a second, listener computing device (i.e., a listener) having a location satisfying the distance restriction. The asset can be made available to an eligible listener as a download in response to receiving a request for the asset from the listener.

Computer-implemented systems and methods are disclosed for providing a server-based service for location-based asset sharing. An exemplary server system hosts a cloud-based service which allows publishers to share assets such as documents or other electronic content with appropriate listeners within a desired vicinity. Embodiments allow publishers to make a selected asset readily accessible to listeners at a location by sending a publication request to the cloud service. An example publication request includes a unique identifier for the asset, a distance restriction, and a publication location. In an embodiment, the selected asset is uploaded from the publisher to the cloud-based service, which creates a publication including the distance restriction and publication location, and stores the uploaded asset in an asset storage database or data store. The cloud-based service can create a publication based on a publication request received from a publisher, wherein the publication request identifies an asset to be shared by the publisher. Alternatively, the cloud-based service can create a publication in response to receiving an electronic asset including metadata with a distance restriction a publication location. For example, upon receiving an uploaded asset from a publisher, a server system hosting a cloud service can parse the asset to identify a publication location and distance restriction stored in the asset's metadata. According to this embodiment, a publication can be created and stored without requiring a publication request that is separate from the asset. One embodiment enables quick access to shared asset via two inputs (i.e., two clicks or selections) rather than requiring several steps, selections, logins, or other inputs to identify, download and view shared assets. The cloud service also allows published assets to be accessed by multiple listener computing devices (i.e., listeners) via a simple opt-in input at each listener device rather than via several steps or inputs at each listener for selecting, requesting, and downloading the shared assets.

The following non-limiting examples are provided to help introduce the general subject matter of certain embodiments. In accordance with embodiments, publisher users interact, via input devices, with computing devices to identify assets they wish to share and to configure publication criteria for such assets. The publication criteria include a distance restriction stipulating the scope of location sharing for the assets. In certain embodiments, publisher users can configure other publication criteria, such as, for example, time criteria and a control list constraining access to certain predefined groups and/or registered users that the publisher users wish to share published assets with. Exemplary time criteria can include an expiration date, an expiration time, and/or a duration for each shared asset. In embodiments where time criteria are configured, an asset is only provided to a requesting listener device if the expiration date, the expiration time, or the duration has not passed.

Publishers can upload copies of assets to be published to a server system hosting a cloud service. Corresponding publications for such assets include information identifying storage locations of the assets on the server system. In additional or alternative embodiments, publications include information uniquely identifying the storage location of a shared asset stored in a network-accessible storage device. The network-accessible storage device can be remote from the publisher and the server system hosting the cloud service. For example, the remote storage location can be a cloud-based storage device accessible via the cloud service. According to embodiments, instead of uploading a copy of a shared asset to the server system, a publisher transmits a pointer or link to the remote storage location to the server system.

In one embodiment, information uniquely identifying an asset copied to the asset storage is stored with the publication. For example, after an asset being published is received at a server system via an upload from a publisher, a URL or network address uniquely identifying the asset's storage location may be saved as part of a corresponding publication for asset. The server system can receive information uniquely identifying an asset as part of a publication request from a publisher, and then store the information in a database, data store, computer readable medium, or another storage device accessible from the server system. In certain embodiments, a copy of an asset selected for publication is uploaded to the server system by the publisher. The server system can host a cloud application and offer a cloud storage service for the asset storage. A non-limiting example of a cloud application is Adobe® Creative Cloud® server software.

According to embodiments, a listener can attempt to download of a published asset stored in a cloud-based storage of a server system. If the listener satisfies the publication criteria for the asset, a reference to the storage location of the asset in the server system can be transferred from the server system to the listener via a wireless data network. In this embodiment, the download attempt triggers an asset request identifying the asset and the request is sent from the listener to the server system.

In certain embodiments, location-based sharing of assets between different computing devices is secured by encrypting assets selected for publication. According to these embodiments, an asset is encrypted prior to transmission or upload to the server-based system for storage. In cases where a published asset is encrypted, a decryption key usable to decrypt the encrypted asset is generated. In an embodiment, the encryption and generation of the decryption key occurs on a computing device where the asset is selected for publication. The decryption key is stored in the storage medium of the input device and can be received from the computing device via the wireless transceiver of the input device. If an encrypted asset is subsequently requested as part of an asset request or an asset association request at a computing device, the encrypted asset can be transmitted to the requesting computing device from the server system. The decryption key is transmitted to the listener computing device from the input device that requested the asset. The encrypted asset is then decrypted using the decryption key. In an embodiment, the decryption occurs on the listener computing device before the asset is rendered in a display on the listener.

Data representing the asset to be shared can also be serialized for transmission to a server system providing asset storage. A non-limiting of serializing asset data for transmission includes converting the asset data into an Extensible Markup Language (XML) format, such as a Flash XML Graphics (FXG) format. For example, at upload time, the publisher computing device asynchronously transmits the asset to the asset storage provided by the server system. The transmitted asset may be encrypted prior to transmission from the publisher computing device to the asset storage provided by the server system. In some embodiments, the asset storage can be accessed by listener computing devices (i.e., listeners) via an instance of a cloud-based service executing on the server system. The cloud-based service can save the asset data to the asset storage by, for example, performing a memory caching operation that stores the data to the asset storage. The cloud service can notify one or more listeners subscribing to the cloud service that the asset is available for download from the server system. A listener can access the asset storage via the cloud service. The listener can retrieve a copy of the asset from the asset storage and store the asset in a memory of the listener. In cases where the asset previously uploaded to the asset storage by the publisher computing device was encrypted, the retrieved copy is also encrypted. In this example, the encrypted copy of the published asset is retrieved from the asset storage and then decrypted before being rendered or displayed by the subscribing listener.

In accordance with one embodiment, a cloud application executing on a server system can perform one or more operations on a published asset before providing the asset to a requesting, listener device. For example, the cloud application can receive an asset in response to a publisher device receiving input selecting the asset for publication and subsequently receive a request for the asset in response to a listener device receiving an input requesting the asset. In some embodiments, the cloud service can identify eligibility for accessing an asset based on metadata provided by a publisher uploading the asset to the server system. As used herein, the term "metadata" is used to refer to information associated with (and generally but not necessarily stored with) an asset or other electronic content item that provides information about a feature of the electronic content item. Metadata may include information uniquely identifying an asset, a distance restriction for the asset, and/or a publication location for the asset. Metadata may describe a storage location or other unique identification of the asset. Such metadata may include a reference to a storage location of an asset in a server system. One example of such a reference is a Uniform Resource Locator (URL) identifying the storage location on a web server associated with the server system. Non-limiting examples of metadata for an asset can include a title, author, access privileges, keywords, and the like. Metadata may also describe a relationship between a first asset and a second asset, such as how the first and second assets can be combined and sequenced for a multimedia presentation. Metadata can also describe when and how an asset was created, such as information identifying application used to create the asset, a timestamp, a file type, encryption status, and other technical information for the asset, and/or access rights for the asset. In certain embodiments, the asset is encrypted before being transmitted or uploaded to the server system. Depending on the encryption status and/or access rights, an asset may be transmitted to/from the server system via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet. SSL and TLS protocols encrypt segments of data network connections using asymmetric cryptography for key exchange, symmetric encryption for confidentiality, and message authentication codes for message integrity. In some embodiments, metadata includes data included in the asset that is not displayed by an application using the asset.

In another embodiment, a client application executed on a publisher computing device to perform a publishing operation can receive input from a publisher user identifying one or more listener users, groups, or listener computing devices that may receive a published asset from the server system. The publisher computing device can identify an asset that was created in a first application executed at the publisher computing device, such as a graphics application executed on the publisher user's tablet computer. The publisher computing device can select the asset for transmission to the server system in response to an input received in a publisher UI. The publisher computing device can upload the asset to a server system providing asset storage. The publisher computing device can obtain a network identifier, a reference to the storage location of the asset in the server system, or other unique identifier for the asset stored to the server system. For example, the client application providing the asset to the server system can obtain a reference such as a uniform resource locator (URL) or other reference to the storage location of the asset in the server system. The server system can identify at least one listener device that is discoverable by the server system on the data network and/or another wireless network accessible by the server system and the listener computing device. In alternative or additional embodiments, instead of or in addition to uploading a shared asset to a server system, the publisher computing device can provide the server system with a unique identifier for or reference to the shared asset. The identifier or reference can be sent from the publisher device to the server system with a publication request. The asset can be retrieved by the second computing device, such as another tablet computer or a laptop computer, via a second connection to the server system using the identifier or reference.

A client application executing on a listener device can be used to send asset association requests and asset requests to the server system. Any suitable process can be used for downloading or retrieving a shared asset at the listener device. For example, a unique identifier or reference provided by the server system in response to an approved asset request can be used by a client application on a listener performing a download or view operation. In one non-limiting example, a cloud service may verify that a listener computing device is authorized to retrieve the asset from the server system based on the properties of the listener computing device. The properties can include the GPS location of the listener and a listener user or group associated with the listener device. The listener computing device may request a shared asset from a cloud service in response to an input from a listener user received in a listener UI rendered on the listener device. The request for the asset provided to the server system may include a unique identifier or reference, such as a URL. The cloud service may verify that the listener computing device is authorized to retrieve the asset from the server system based on the GPS location of the listener computing device, and a listener user or group provided with the request for the shared asset.

In another embodiment, a matchmaker module on a server system application can perform one or more matchmaking and publishing operations using information stored in server system, an associations database, and a user and group repository. For example, a server system can identify a listener location and other listener properties of a listener device, such as a smartphone, and establish a connection over a data network between the listener device and the server system. In embodiments, a connection between the listener device and the server system is a secure network connection via secure links of the network and/or established using a secure protocol, such as, but not limited to, SSL or TLS. In an embodiment, a publisher computing device can identify publication criteria for an asset via a client application executed at the publisher computing device. The publisher computing device can upload the asset to the server system via a connection over the data network. The connection between the publisher device and the system can be a secure network connection via secure links of the network and/or established using a secure protocol. In an embodiment, a listener computing device obtains (i.e., downloads) a copy of an uploaded, shared asset from the server system via a secure connection over the data network. An application executing on the listener computing device can render the shared asset downloaded from the server system on the listener's display device.

According to additional or alternative embodiments, assets uploaded to the server system are encrypted at the publisher computing device prior to upload or transmission. In these embodiments, the shared asset subsequently obtained by a listener device from the server system is an encrypted asset. In one such embodiment, a listener UI is used to request the asset at the listener computing device as part of an asset request. In this embodiment, the server system can transmit a decryption key to the listener computing device. The listener computing device then decrypts the encrypted asset obtained from the server system using the decryption key.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications and modules hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application or module can access data packets addressed to the port. Listener properties, publication requests, asset association requests, association approval requests, publisher acceptance messages, asset-listener associations, and published assets can be sent via network connections and communications channels.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

These illustrative examples are given to introduce the reader to the general subject matter discussed here and are not intended to limit the scope of the disclosed concepts. The following sections describe various additional embodiments and examples with reference to the accompanying. In the drawings, generally, common or like reference numbers indicate identical or functionally similar elements. Additionally, generally, the left-most digit(s) of a reference number identifies either the drawing in which the reference number first appears or the drawing in which a related element first appears. The following sections describe various additional embodiments and examples with reference to the drawings in which like numerals indicate like elements. For brevity, only the differences occurring within the Figures, as compared to previous or subsequent ones of the figures, are described below.

Exemplary Architecture

Referring now to the drawings, FIG. 1 is diagram illustrating an example high level architecture showing asset storage 110 (denoted as document storage in the example of FIG. 1), associations database 114 and user and group repository 122 accessible via a cloud service hosted on a server system 104. In particular, FIG. 1 depicts a location-based asset sharing architecture 100 for sharing published asset(s) 132 with a listener 134 via the server system 104. The listener 134 can include any type of computing device, such as tablet computers, smartphones, notebook computers, laptop computers, etc. In exemplary embodiments, the listener 134 can be a mobile device executing the iOS from Apple Inc., such as an iPhone™, an iPod™, an iPad™. The listener 134 can be a device operating the Android operating system (OS) from Google Inc. Listener 134 can also have HyperText Markup Language (HTML) 5 capabilities and/or be embodied as a BlackBerry® device. According to additional exemplary embodiments, the listener 134 can be, but is not limited to, a personal computer (PC), a Personal Digital Assistant (PDA), a tablet computing device, a device running the Microsoft Windows® 8 OS, a device running the Microsoft Windows® Phone OS, a device running the Symbian OS, a device running the webOS from Hewlett Packard, Inc., a smartphone, a hand held computer, a netbook computer, a palmtop computer, a laptop computer, an ultra-mobile PC, a portable gaming system, or another similar type of mobile computing device having a capability to communicate with an input device (see, e.g., input devices 208 shown in FIG. 2) and the cloud service hosted by the server system 104 via a data network (see, e.g., data network 206 shown in FIG. 2).

As shown in FIG. 1, the listener 134 can exchange communications with the server system 104. The exemplary communications include listener properties 102, asset association requests 135, and asset requests 136. Exemplary listener properties 102 depicted in FIG. 1 include authentication information, such as identity of a registered listener user, and a listener location from a GIS or location service. The exemplary asset association request 135 is a request from the listener 134 sent to the server system 104, wherein the request is for the server system 104 to match the listener 134 with publishers whose publication criteria for published assets 132 are satisfied by the listener properties 102. For any matches, the server system 104 retrieves information/records from associations database 114. This information identifies an existing association between a published asset 132 and a listener 134 whose listener properties 102 match publication criteria for that published asset 132.

With continued reference to FIG. 1, the listener 134 can also submit an asset request 136 to the server system 104. As shown, the asset request 136 can be in the form of an attempt to download a published asset 132 to listener 134. Once a published asset 132 has been downloaded, it can be viewed at listener 134.

In some embodiments, the listener 134 can also function as publisher usable to upload assets to the server system 104 and send publication requests 130. As shown in FIG. 1, a publication request 130 can be sent from a publisher to the server system 104 with an upload of an asset. Additional details regarding a publisher and a publication request 130 are described below with reference to exemplary publishers 234 and 234a depicted in FIGS. 2-4.

Exemplary System Implementation

Figure 2:
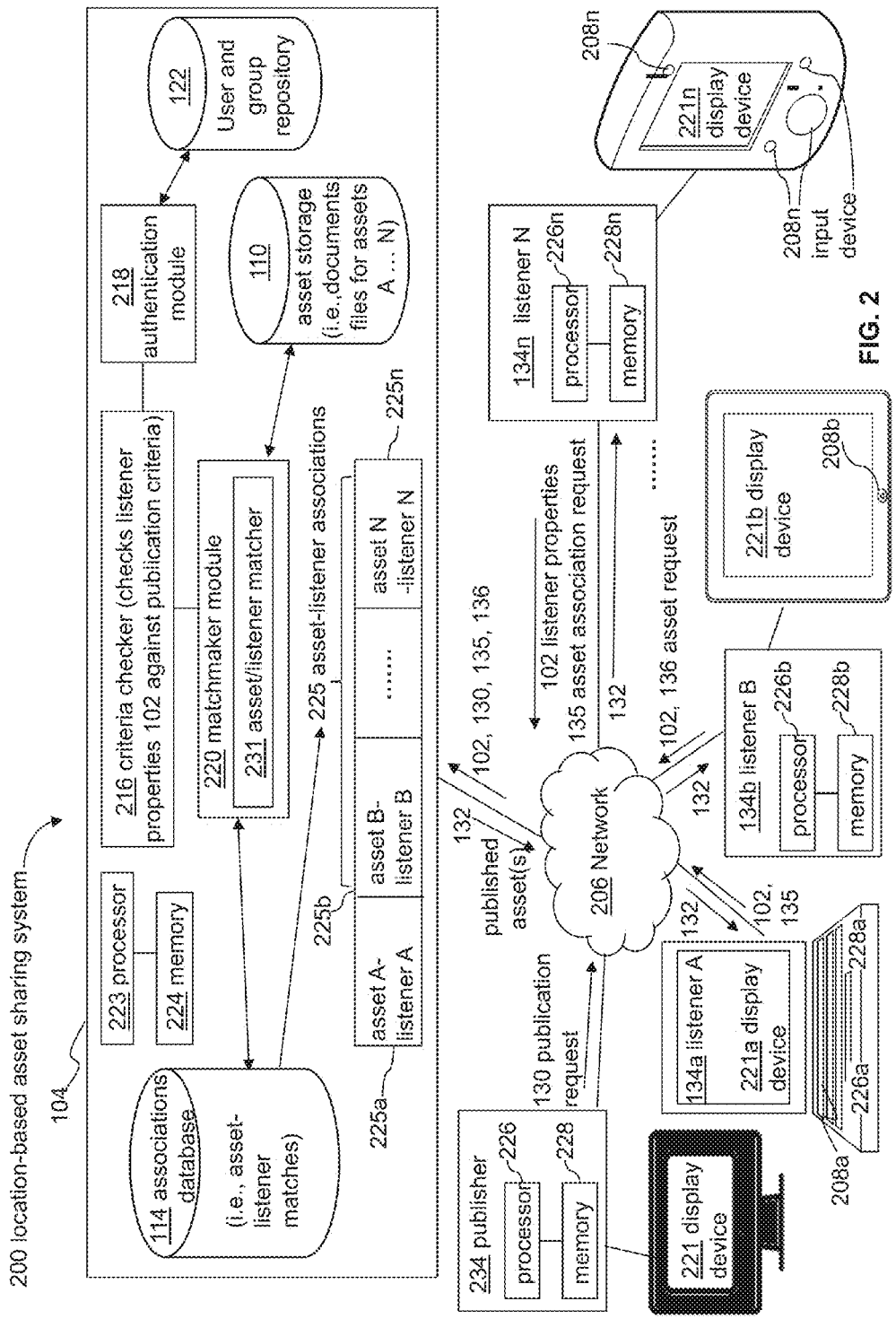
FIG. 2 is a block diagram depicting components for a location-based asset sharing system, in accordance with embodiments.

FIG. 2 is a block diagram depicting an example system implementing certain embodiments. In particular, FIG. 2 is a block diagram illustrating components of a location-based asset sharing system 200. The example system 200 includes server system 104 configured to perform server-side processing in response to inputs and communications such as listener properties 102, publication requests 130, asset association requests 135, and asset requests 136 received from a publisher 234 and listeners 134a-n via a network 206. Server-side processing is performed by the server system 104 to keep track of listeners 134a-n in the system 200 who have sent listener properties 102, listener users who are logged in, when the listeners 134a-n sent their respective listener properties 102, when listener users logged in the last time and where from and tries to connect to everything else that is available next to that location As shown in FIG. 2, the location-based asset sharing system 200 includes the publisher 234 which can include a processor 226 communicatively coupled to a memory 228. Location-based asset sharing system 200 includes the server system 104, listeners 134*a-n*, and a network 206. Publisher 234 and listeners 134*a-n* are coupled to server system 104 via a network 206. Processors 226*a-n* are each configured to execute computer-executable program instructions and/or accesses information stored in respective ones of memories 228*a-n*. Server system 104 includes a processor 223 communicatively coupled to a memory 224. Processor 223 is configured to execute computer-executable program instructions and/or accesses information stored in memory 224. Processors 223, 226, and 226*a-n* shown in FIG. 2 may comprise a microprocessor, an application-specific integrated circuit (ASIC), a state machine, or other processor. For example, processor 223 can include any number of computer processing devices, including one. Processor 223 can include or may be in communication with a computer-readable medium. The computer-readable medium stores instructions that, if executed by the processor, cause one or more of processors 223, 226 and 226*a-n* to perform the operations, functions, and steps described herein. When executed by processor 223 of server system 104, the instructions can also cause processor 223 to implement the modules shown in FIG. 2. When executed by one or more of processors 226*a-n* of listeners 134*a-n*, the instructions can also cause processor to render the user interface shown in FIG. 2 on respective ones of display devices 221*a-n*.

A computer-readable medium may comprise, but is not limited to, an electronic, optical, magnetic, or other storage device capable of providing a processor with computer-readable instructions. Other examples comprise, but are not limited to, a floppy disk, a CD-ROM, a DVD, a magnetic disk, a memory chip, ROM, RAM, an ASIC, a configured processor, optical storage, magnetic tape or other magnetic storage, or any other medium from which a processor such as processor 223, processor 226, or processors 226*a-n* can read instructions. The instructions may comprise processor-specific instructions generated by a compiler and/or an interpreter from code written in any suitable computer-programming language. Non-limiting examples of a suitable programming language can include C, C++, C#, Visual Basic, Java, Python, Perl, JavaScript, and ActionScript.

Publisher 234 and listeners 134*a-n* may also comprise a number of external or internal devices, including input devices such as a mouse, keyboard, stylus, touch sensitive interface. Publisher 234 and listeners 134*a-n* can also comprise an optical drive such as a CD-ROM or DVD drive, a display device, audio speakers, one or more microphones, or any other input or output devices. For example, FIG. 2 depicts the listener 134*a* having a processor 226*a*, a memory 228*a*, and a display device 221*a*. A display device 221 can include (but is not limited to) a screen integrated with a publisher 234, such as a liquid crystal display (LCD) screen, a touch screen, or an external display device 221, such as the exemplary monitor display device shown in FIG. 2.

FIG. 2 also illustrates listeners 134*a-n* including respective display devices 221*a-n*. Listeners 134*a-n* include listener applications capable of submitting asset association requests 135, asset requests 136, and displaying published assets 132. The listener applications executing on listeners 134*a-n* can be client applications including one or more software modules that configure processors 226*a-n* to retrieve, via a network 206, one or more published assets 132, as permitted by publication criteria checked by the server system 104. Such listener applications can configure processors 226*a-n* to render a published asset 132 for viewing on display devices 221*a-n*.

The publisher 234 and listeners 134*a-n* can include any suitable computing device or system for communicating via a data network 206 and executing the publisher and listener applications. Non-limiting examples of a suitable computing device or system include a desktop computer, a notebook computer, a tablet computer, a smartphone, or any other computing device or system suitable for uploading assets to be shared, submitting publication requests 130, transmitting listener properties 102, submitting asset association requests 135, submitting asset requests 136, and downloading and viewing published assets 132.

In some embodiments, listener client applications can be executed on different computing devices (e.g., listeners 134*a-n*) as depicted in FIG. 2. As used herein, the term "location-based asset sharing" refers to operations for publishing, uploading, and downloading or viewing a published asset 132 between different computing devices (e.g., publisher 234 and listener 134*a*) based on a publication location for the asset and a location of the listener 134*a*. Listener client applications executing on listeners 134*a-n* can receive input data from respective input devices 208*a-n*. In additional or alternative embodiments, a listener client application running on a touch computing device having a touch-sensitive display device, such as the exemplary display device 221*b* shown in FIG. 2, can receive touch inputs selecting a published asset 132 for download or viewing. The input data can be generated in response to an input by an input device 208 or touch input at a display device 221 of a listener 134 at which a listener client application is executing, such as the exemplary tablet listener 134*a* depicted in FIG. 2.

Assets to be published are identified in a publication request 130. In embodiments, the assets are uploaded to server system 104 from publisher 234 via network 206. As part of the upload process, an asset to be uploaded can be serialized for transmission to the server system 104. A non-limiting example of an input to initiate access of a published asset is a button click or a touch input such as a finger tap or other touch input from an input device, such as a stylus. For example, a button click of input device 208*a* or touch input in a UI rendered on a touch display device 221*a* can initiate an asset request 136. Embodiments enable a listener 134 to access (i.e., view or download) published assets 132 via a simplified workflow that only requires two inputs (i.e., two clicks in a display device 221 or with an input device 208). For example, in cases where a published asset 132 is already associated with a listener 134, a corresponding asset-listener association 225 can be retrieved from associations database 114. The data representing the asset to be uploaded from publisher 234 can be serialized for transmission to server system 104. A non-limiting of serializing asset data for transmission includes converting the asset data into an Extensible Markup Language ("XML") format, such as a Flash XML Graphics ("FXG") format. An upload of an asset, either prior to or concurrent with submission of a publication request 130 from publisher 234, can be performed via asynchronous transmission of the asset to the server system 104 via network 206.

In some embodiments, the cloud service hosted by server system 104 can transmit a notification message to the publisher 234 indicating which listeners 134*a-n* have obtained (i.e., downloaded) a published asset 132. The notification message can notify a publisher user associated with the publisher 234 that an asset they previously uploaded and published via a publication request 130 has been downloaded by a particular listener user associated with a listener 134. In other embodiments, no notification message may be provided.

In some embodiments, the notification message can include any message suitable for transmission or broadcast via a protocol for real-time or near real-time communication over the network 206, such as, but not limited to, an instant messaging protocol. A non-limiting example of a notification message is an Extensible Messaging and Presence Protocol (XMPP) message.

A listener 134 can initiate a download operation from the asset storage 110 in response to a successful asset request 136. In certain embodiments, downloading a published asset 132 from the asset storage 110 can be expedited by an asset-listener association 225 having been previously created in associations database 114 as a result of a prior asset association request 135. Additional details regarding data flows and communications for asset association requests 135 are described below with reference to FIG. 3. In an embodiment, a published asset 132 is transmitted from the server system 104 to the destination or requesting listener 134 as serialized data. Downloading and viewing the published asset 132 can include using and/or storing the published asset 132 received from the cloud service hosted by server system 104 via serialized data in a local memory 228*a-n*. For example, a listener application executed on a listener 134*b* can configure a processor 226*b* to store the downloaded, published asset 132 in the memory 228*b*.

In cases where the published asset 132 is stored in the asset storage 110 in encrypted form, the listener 134 at which the requesting listener client application is executing can invoke a decryption module to decrypt the published asset 132 to produce a decrypted copy of the published asset 132. In this example, the decryption key will be received by the listener 134. The decryption module can be a component, module, or part of a listener client application. In alternative embodiments, the decryption module can be external to the client listener application. For example, the decryption module can be a separate application or part of an application library elsewhere on listener 134.

In embodiments, the determination as to whether to provide a published asset 132 to a particular listener 134 can be based on listener properties 102 indicating device and/or a platform properties of the listener 134 when the corresponding asset request 136 was submitted. According to embodiments, the device properties can include the MAC address and/or the IP address of the listener 134. In embodiments, the platform information can identify one or more of an operating system (OS) of the listener 134, registered users associated with the listener 134, and applications installed on the listener 134. Based at least in part on one or more the device and platform information, the server system 104 can determine if a published asset 132 can be provided in accordance with its publication criteria. In response to determining that the requested asset 132 can be provided to the listener 134, a copy of the published asset 132 is retrieved from the asset storage 110.

Although FIG. 2 depicts criteria checker 216, authentication module 218 and matchmaker module 220 as separate modules, one or more of these modules can be included as a software module of a single application. Similarly, while an exemplary asset storage 110 and a user and group repository 122 are shown in FIG. 2 as being hosted locally on server system 104, in alternative embodiments, one or both of asset storage 110 and user and group repository 122 can be hosted on an external server (not shown) remote from server system 104. For example, user and group repository 122 can be hosted on a dedicated database server accessible from server system 104 via network 206. Location-based asset sharing system 200 stores asset-to-listener associations in associations database 114. System 200 stores group and user information, including information for registered listener users and groups associated with listeners 134*a-n*, in user and group repository 122. Descriptions of exemplary functionality of criteria checker 216, authentication module 218, and matchmaker module 220 are provided in the following paragraphs.

In an embodiment, an authentication module 218 is invoked when a listener 134 submits an access request access to a particular asset published asset 132 having publication criteria including a control list with rules for restricting access to the published asset 132 to certain registered users or groups. Publisher users can define the scope of an audience of listeners 134 who are eligible to access their published assets 132 by setting control list publication criteria for their publications. The control list criteria can be sent with the publication request 130. According to example embodiments, there are 3 controls that designate the scope of access control: no restrictions: any listener 134 within the location will be notified that a publication is available; restricted to listeners 134 and/or listener users that publisher users choose (i.e., designate); and restricted to predefined control list of registered listener users and/or groups. According to embodiments, only registered users can access the cloud service and certain published assets 132. In these example embodiments, listener 134 end points such as notebook listener 134*a*, tablet listener 134*b* and smartphone listener 134*n* must have their respective listener services enabled to discover (i.e., 'hear') published documents 132. Enabling a listener service can be conceptualized as an affirmative step taken by a listener user to voluntarily opt-in to the cloud service. For example, a user's computing device may only activated as a listener 134 when the user has selected (i.e., clicked on) a 'look for files' or 'get files' button. An exemplary interface for enabling a listener service is described below with reference to FIG. 5. By allowing users to voluntarily opt-in to having their devices function as listeners 134, system 200 avoids communications with computing devices that are not actively listening for published assets 132. Many mobile platforms, such as, but not limited to, devices running an iOS from Apple Inc., an Android OS from Google Inc., and devices with HTML5 geo-location capabilities, have ways to publish their current GPS location to the cloud service. When the listener service on such devices is enabled, listener locations will be sent to the server system 104 with listener properties 102 so that the cloud service can link up listener users of these devices with published assets 132. System 200 also allows listener users to opt-out of listening after a listener service has been activated. This enables listener users to terminate further communications with server system 104 in cases where they are no longer interested in discovering published assets 132 at a location. For example, users may wish to opt-out in cases where they are no longer enrolled in a class, event, or conference associated with published assets 132 and/or when a meeting, class, event, or conference has ended. Initially, an exemplary listener application will prompt or ask a user of a device to opt-in so they can choose to enable access location-based asset sharing services offered by the cloud service hosted by server system 104. In one embodiment, a second opt-in is possible when a listener application launches so that a listener 134 can get the list of published assets 132 available to that listener 134.

An asset request 136 can be made, for example, in a listener user interface (UI) via input device 208a of a client application or Internet browser executing at notebook listener 134a, via a touch screen display device 221b on tablet listener 134b, or listener user input received via input devices 208n at smartphone listener 134n. The asset request 136 is then sent from the listener 134 to server system 104 via network 206. In one embodiment, when the listener properties 102 and an asset request 136 are received at server system 104, authentication module 218 performs user authentication as described below to determine if a listener user or group associated with the submitting listener 134 is authorized to access the requested published asset 132.

In the exemplary embodiment shown in FIG. 2, the criteria checker 216, checks listener properties 102 against publication criteria for published assets 132 requested via an asset request 136. Exemplary functionality of the criteria checker 216 is described below.

The criteria checker 216 can check a listener location received as part of listener properties 102 against a distance restriction and publication location included in publication criteria for a published asset 132. According to embodiments, publisher users who decide to share assets need to forward or report a publication location to server system 104. The publication location can be forwarded with a publication request 130 and/or periodically reported (i.e., published) as the current location of publisher 234. Publication requests 130 can also designate a distance restriction relative to the publication location. The distance restriction can be conceptualized as a tightness location grouping. For example, a preset, tunable distance restriction can be a defined radius surrounding the publication location. The radius can have one of a plurality of settings or levels. One exemplary level can be a 'Best surrounding' or immediate proximity setting (i.e., a 3 foot radius). The Best surrounding setting can be used in cases where a more filtered relationship exists between a publisher 234 and a single listener 134 (i.e., a 1-1 relationship) or a small number of listeners 134 exchanging/sharing assets such as in an individual office setting, in an environment where the publisher user and listener users are seated close to each other, when a publisher 234 and listeners 134 are on the same table, etc. Another example level can be an immediate surrounding distance restriction set as a larger radius (i.e., a 10-meter radius) in cases where assets need to be shared with a larger vicinity such as small classrooms, conference rooms, etc. Yet another exemplary level can be an unlimited distance restriction used when a published asset 132 is to be shared between a publisher 234 and a listener 134 anywhere (i.e., no distance restriction). The criteria checker 216 can also invoke the authentication module 218 to authenticate any listener user credentials received with the listener properties 102, an asset association request 135, or an asset request 136. The authentication module 218 authenticates such credentials by validating them against data for registered users stored in the user and group repository 122. As shown in FIG. 2, published assets 132 can be stored as documents and files for assets in the asset storage 110. In an embodiment, publication data for each published asset 132, including a distance restriction, publication criteria, and a reference or unique identifier for the published asset 132 is stored collectively in a publication. The publication can be stored with the asset storage 110 or in a separate data store, repository, or database accessible from the server system 104.

In an embodiment, listeners 134 comprise one or more input devices 208a (i.e., a keyboard and track pad) configured to interact with a listener UI of a notebook listener 134a, an input device 208b of a tablet listener 134b having a touch screen display device 221b, and input devices 208n of a smartphone listener 134n. In an embodiment, a client device, such as listener 134b, may be integrated with a display device 221b, so that the two form a single, integrated component. Listeners 134a-n can include any suitable computing devices for communicating via network 206 to furnish listener properties 102, request a published asset 132, download the published asset 132, and render the published asset 132 for viewing on display devices 221a-n. The downloading and viewing of published assets 132 at a particular listener 134 is performed permitted by the server system 104. The determination as to whether to provide a requested asset is made by the server system 104 according to publication criteria and an asset-listener association 225 established between the published asset 132 and the listener 134.

As shown in FIG. 2, each of the listeners 134a-n is coupled to server system 104 through network 206. Although not depicted in FIG. 2, in an alternative embodiment, the server system 104 can be located separately from user and group repository 122. Listeners 134a-n receive operational commands from listener users, including commands to opt-in to the location-based asset sharing cloud service hosted by server system 104, commands to send asset association requests 135, commands to request assets (i.e., to send asset association requests 136), and commands to download and view a requested published asset 132.

In the exemplary embodiment shown in FIG. 2, matchmaker module 220 consists of a sub-module or component, an asset/listener matcher 231. Exemplary functionality of matchmaker module 220 and its matcher component is described below.

As shown in FIG. 2, matchmaker module 220 is configured to interact with user and group repository 122 and asset storage 110 to determine one or more asset-listener associations 225 for an authenticated user. By invoking matchmaker module 220, the cloud service fulfills a matchmaking role to match published assets 132 and listeners 134a-n who wish to find published assets 132 around them (i.e., within a specified GPS range or vicinity). The cloud service can filter for a location match based on listener locations included in listener properties 102 and publication locations indicated in publication requests 130. Matchmaker module 220 determines whether publication locations, listener locations, distance restrictions, and GPS ranges match alignment. In certain embodiments, matchmaker module 220 may invoke an asset/listener matcher 231 and/or an authentication module 218 to determine whether a published asset 132 can be provided in response to a particular asset request 136 from a given listener 134. For example, a publisher user can optionally designate an approver list or access control list as publication criteria in a publication request 130. An exemplary approver list from publisher 234 can designate registered listener users as being authorized to download a published asset 132. Such an approver list can be used to implement location-based asset sharing workflows in cases where a set of registered listener users is known, such as in class rooms, training available to certain members, and events, meetings, and conferences with registered attendees. Publication criteria can also include time criteria such as duration or timeout so that publications for published assets 132 can be designated with timeouts. For example, a timeout or duration publication criteria can be used to implement certain location-based asset sharing workflows such as an examination or test being shared with a classroom location, coupons, daily deals (i.e., deal-of-the-day offers), and other time-sensitive specials and promotions being shared in the vicinity of a merchant.

In the embodiment of FIG. 2, matchmaker module 220 is invoked in response to determining that a listener user has been successfully authenticated by authentication module 218. At this point, matchmaker module 220 invokes criteria checker 216 to perform the above-described publication criteria checking functionality. Matchmaker module 220 checks to see if an asset-listener association 225 already exists or can be created for listener 134 by determining if the listener properties 102 received from that listener 134 can be matched to publication criteria for a published asset 132 in asset storage 110. If so, the listener 134 is associated with the corresponding published asset 132 stored in asset storage 110 and an asset-listener association 225 is created and stored in the associations database 114. Otherwise, no asset-listener association 225 is created. In an embodiment, the publication criteria can be established and modified by a publisher user using a publisher UI, such as the exemplary publisher UI described below with reference to FIG. 5. User and group repository 122 contains information for each publisher user, listener user, and group in the location-based asset sharing system 200. Asset storage 110 can be implemented as any data store, repository, or database table having a record for each published asset 132 uploaded from a publisher 234. In additional or alternative embodiments, group membership information, including identities of registered listener users, can also be stored in user and group repository 122.

In accordance with embodiments, matchmaker module 220 can invoke asset/listener matcher 231 to determine if a registered user, group, organization or entity indicated in listener properties 102 or an asset request 136 matches publication criteria for a published asset 132. For example, if a registered user, group, entity and/or organization information, such as an employer, department, business unit, practice group, or office location is included in listener properties 102 or an asset request 136; asset/listener matcher 231 can perform a lookup in user and group repository 122 for that user, group, entity and/or organization information. If a match between the user, group, entity or organization to a user, group, entity or organization is found for a publication, matchmaker module 220 can create an asset-listener association 225 pursuant to that match.

It is to be appreciated that the server system 104 can establish asset-listener associations 225 for any listener 134 based on listener properties 102 and data included in an asset association request 135. Asset association requests 135 may include credentials usable by the authentication module 218, such as a user name for a listener user and a password. As shown in FIG. 2, listener properties 102 may be submitted implicitly from listeners 134a-n to the server system 104 via the network 206 or explicitly entered via input devices 208a-n. Asset requests 136 as described herein refer to a request for any published asset 132 that is, generally, available for delivery to an individual listener 134, with delivery initiated upon successfully determining that a listener location included in listener properties for that listener satisfies a distance restriction for the published asset 132. A determination to provide a published asset 132 in response to a given asset request 136 can also be based in part on the authentication module 218 successfully authenticating any credentials included in listener properties 102 associated with the listener 134 submitting that asset request 136. In response to an asset association request 135 from a listener 134, server system 104 may store an asset-listener association 225 in the associations database 114. The asset-listener assignment 225 can be based on a correlation between a listener location included in listener properties 102 and publication criteria for a published asset 132 stored in the asset storage 110. In embodiments, the correlation can be performed by the matchmaker module 220 and its asset/listener matcher 231.

According to an embodiment, location-based asset sharing system 200 displays an administrator UI (shown in FIG. 2) on display device 221. In embodiments, display device 221 may be one or more of a monitor, a display of a tablet device (see, e.g., display device 221b), the display of a laptop, the display of a mobile phone (see, e.g., display device 221n), or the display of a personal computer (see, e.g., display device 221a).

The server system 104 can receive listener properties 102, publication requests 130, asset association requests 135, and asset requests 136 via the network 206. As permitted by the criteria checker 216 and authentication module 218, the server system 104 can also provide published assets 132 to a requesting listener 134 via the network 206. Asset-listener associations 225a-n include a user account matched to at least one group from the user and group repository 122. Asset-listener associations 225a-n may be resident in any suitable computer-readable medium, user and group repository 122, and/or memory 224 of server system 104. In another embodiment, the asset-listener associations 225a-n can be accessed by the server system 104 from a remote location via network 206.

The server system 104 can include any suitable computing system for hosting the asset storage 110, associations database 114, criteria checker 216, authentication module 218, matchmaker module 220, and user and group repository 122. As shown in FIG. 2, the server system 104 includes a processor 223 coupled to a memory 224. In one embodiment, the server system 104 may be a single computing system. In another embodiment, server system 104 may be a virtual server implemented using multiple computing systems or servers connected in a grid or cloud computing topology. As described below with reference to FIG. 9, processor 223 may be a single processor in a multi-core/multiprocessor system. Such a system can be configured to operate alone with a single server, or in a cluster of computing devices operating in a cluster or server farm.

Network 206 may be a data communications network such as the Internet. In embodiments, network 206 can be one or a combination of networks such as an entity's intranet, the Internet, a Wide Area Network (WAN), WiFi, a Local Area Network (LAN), or any other wired or wireless network. Server system 104 may provide requested resources via network 206. Depending on access rights in an assigned group, authenticated users may only be granted access to resources or electronic content via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet.

Listeners 134a-n can establish respective network connections with server system 104 via network 206. One or more of an email application, an Internet browser, or another client application used to request a published asset 132 can be executed at a listener 134 to establish a network connection via network 206. The network connection can be used to communicate packetized data representing requested resources between server system 104 and listener 134.

For example, as permitted by criteria checker 216 and authentication module 218, server system 104 can provide a published asset 132 as electronic content via network 206. A client application or Internet browser can access the published asset 132 by downloading the published asset 132 from server system 104 via network 206. Server system 104 can provide the published asset 132 as packetized data. A client application or Internet browser executing on a particular listener 134, such as, for example, notebook listener 134a, can configure a processor 226a of listener 134a to render a retrieved resource for display on display device 221a.

With continued reference to FIG. 2, the cloud service hosted on server system 104 can be comprised in the memory 224 of the server system 104 and can be accessed from client applications respectively comprised in the memories 228a-n of listeners 134a-n. The criteria checker 216, matchmaker module 220, and authentication module 218 can be implemented as a cloud application stored in the memory 224. Such a cloud application can configure the processor 223 to manage and provide a cloud service accessible by respective publisher and listener client applications running on publisher 234 and listeners 134a-n. In the non-limiting example of FIG. 2, the memory 224 together with asset storage 110 can function as cloud storage. In alternative embodiments, cloud storage can be implemented as a separate cloud storage device. The cloud storage device can be implemented as one or more file servers, one or more database servers, and/or one or more web servers that form part of the server system 104. The cloud application can include one or more modules for receiving, storing, providing, or otherwise sharing published assets 132 in a cloud service accessed by listeners 134a-n. The cloud storage device can be implemented as a virtual, network-accessible storage device used by the cloud application to store and provide published assets 132 in a server system accessed by listeners 134-an. The cloud application can store and provide encrypted copies of published assets 132 in order to provide a secure server-based (i.e., cloud-based) asset storage 110. A non-limiting example of a cloud application is Adobe® Creative Cloud server software.

Each of the publisher 234 and listeners 134a-n can include one or more software modules for establishing communication with a cloud service hosted by server system 104. Each of the publisher 234 and listeners 134a-n can also include one or more software modules for performing functions in addition to establishing communication with the cloud service hosted by server system 104. For example, each of the listeners 134a-n can include a listener application having a software module for communicating with the cloud service hosted by server system 104. In some embodiments, each of the listeners 134a-n can have a different type of listener application including different functionality. For example, a listener application on notebook listener 134a may have more robust functionality than a listener application deployed to smartphone listener 134n. In some embodiments, a publisher application installed on publisher 234 and listener applications deployed to listeners 134a-n can be stand-alone applications. In other embodiments, the publisher and listener applications can be embedded in another application, such as an Internet browser, a GIS application, a mapping application, or a navigation application.

The server system 104 can include any suitable server or computing device for hosting the cloud service hosted by server system 104. In one embodiment, the server system 104 may be a single server, such as a web or application server. In another embodiment, the server system 104 may be presented as virtual server implemented using a number of server systems connected in a grid or cloud computing topology.

In environments where security is a concern and/or when a secure cloud-based storage is being used, an encrypted copy of the published asset 132 can be retrieved from the asset storage 110.

Although not shown in the example embodiment of FIG. 2, the publisher 234 can also include an encryption module used to encrypt an asset to be published in cases where secure asset storage is desired. In such cases, an encryption module on publisher 234 encrypts an asset prior to uploading it to server system 104 to produce an encrypted copy of the asset, which is saved in asset storage 110 as published asset 132 as discussed below. If a published asset 132 is encrypted before being saved to asset storage 110 as published asset 132, a decryption key usable to subsequently decrypt the encrypted published asset 132 is transmitted to a listener 134 so that the decryption key can be used to decrypt the published asset 132 downloaded to the listener 134. In one embodiment, the decryption key is generated by the encryption module or another module (not shown) and transmitted to the listener 134. In alternative embodiments, the decryption key is obtained from a key store, either on server system 104, publisher 234, or on another, external computing device. The listener properties 102, publication request 130, asset association request 135, asset request 136, and published asset 132 can be exchanged wirelessly between a publisher computing device 234, server system 104, and listeners 134, 134a wirelessly via the network 206.

Exemplary Asset Sharing Sequences

Figure 3:
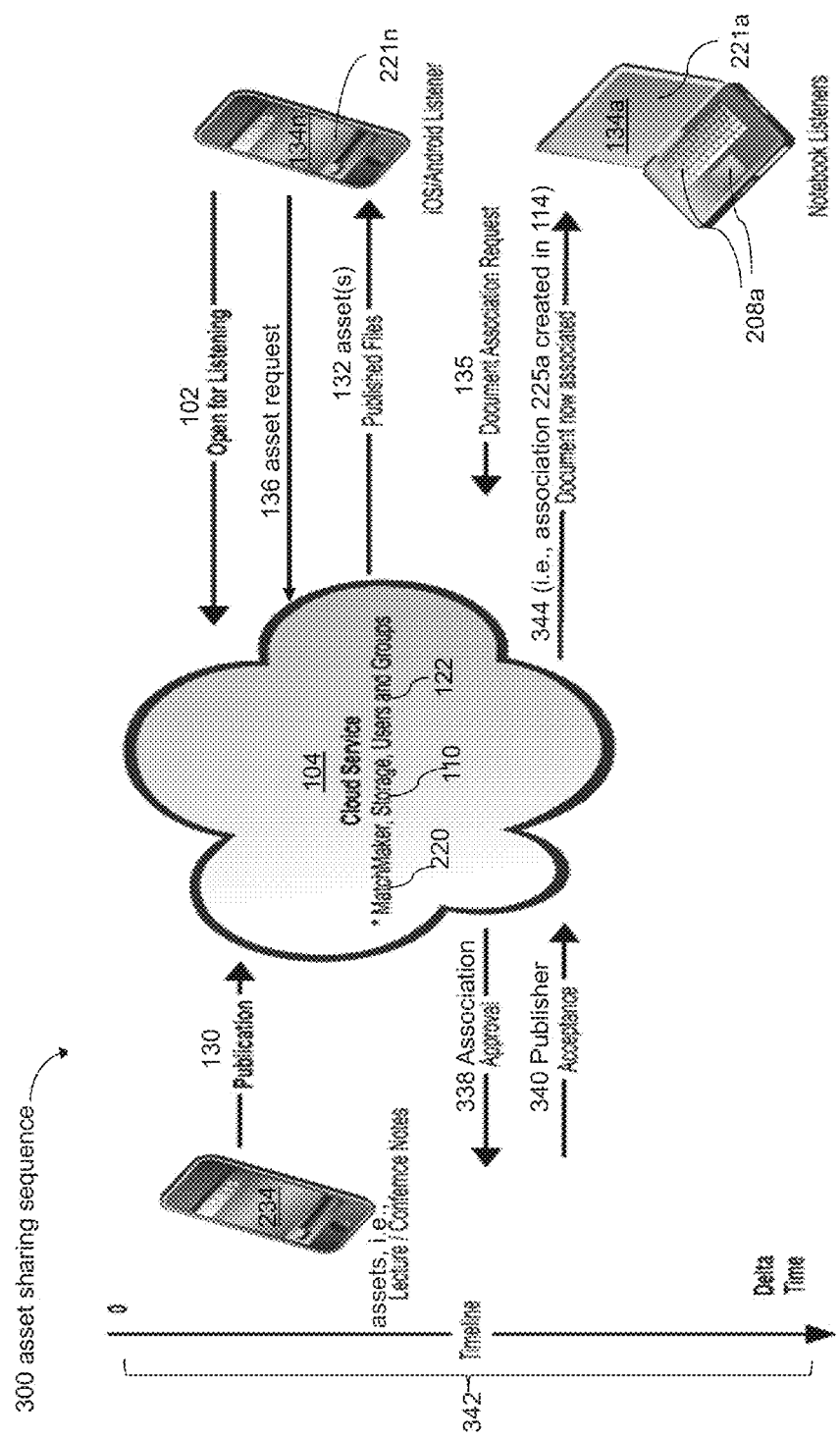
FIG. 3 is a message sequence diagram depicting communication flows between a publisher of shared assets, a cloud service, and listener devices accessing the shared assets, in accordance with embodiments.

FIG. 3 illustrates exemplary message sequences for asset publishing and association operations. In particular, FIG. 3 shows a communications sequence 300 for messages that can be used establish a handshake between a publisher 234 and listeners 134n and 134a. The sequence 300 depicted in FIG. 3 is described with reference to the embodiments of FIGS. 1 and 2. However, the sequence 300 is not limited to those example embodiments. The messages exchanged as part of exemplary sequence 300 can occur in the order shown relative to timeline 342. As shown, as sequence 300 begins, a listener 134 can send listener properties 102 to server system 104. As shown in FIG. 3, server system 104 can host a cloud service with matchmaker module 220, asset storage 110, and user and group repository 122. FIG. 3 is a high-level message sequence diagram depicting an asset sharing sequence 300 for communications among the server system 104, publisher 234, and listeners 134a and 134n.

The following paragraphs describe messages sent and received by publisher 234 and listeners 134a and 134n to establish a proper handshake between publisher 234 and listeners 134a and 134n. As described below, by establishing this handshake, published assets 132 can be associated with a listener 134 (e.g., notebook listener 134a in the example of FIG. 3) and shared between publisher 234 and a listener 134 (e.g., smartphone listener 134n in the example of FIG. 3). In the non-limiting example shown in FIG. 3, published assets 132 are stored on server system 104 along with publication criteria received in a corresponding publication request 130. FIG. 3 also shows that after listener 134n is open for listening (i.e., activated as a listener), listener properties 102 for listener 134n are transmitted to server system 104. As discussed below, when a subsequent asset request 136 for the published assets 132 is received from listener 134n, as permitted by the publication criteria, the published assets 132 provided to listener 134*n*. An asset request 136 can be sent from listener 134*n* as the result of a download or view request at listener 134*n*.

As shown in FIG. 3 and described above with reference to FIGS. 1 and 2, the server system 104 can host a cloud-based asset sharing service (i.e., a cloud service for location-based asset sharing). The cloud service can play the role of matchmaker by invoking matchmaker module 220 to connect publisher 234 to listeners 134*a* and 134*n* by using associations database 114 and the asset-listener associations 225 stored therein as the interchange between publisher 234 and listeners 134*a*, 134*n*. The matchmaker module 220 of the cloud hosted file service uses a publication location given by publisher 234 with the publication request 130 and a listener location included in listener properties 102 as key data points when performing its matchmaking function.

Exemplary Asset Publication Sequence

As depicted in FIG. 3, a publisher user can initiate a publication sequence at publisher computing device 234 by sending a publication request 130 to server system 104. In one embodiment, the publication request 130 can be sent concurrently with a copy of an asset to be published (i.e., at upload time). According to this embodiment, the copy of the asset can be uploaded to server system 104 from publisher 234. The uploaded copy of the asset is then stored in asset storage 110 on server system 104. In another embodiment, a reference, such as a URL, uniquely identifying an asset to be published is sent with publication request 130. In accordance with embodiments, publication request 130 can identify multiple assets to be shared with listeners. In the non-limiting example of FIG. 3, the assets to be shared include lecture and conference notes from publisher 234 and these notes can be shared with listeners satisfying the distance restriction and any publication criteria specified in publication request 130. For example, once published, the exemplary lecture and conference notes assets can be shared with the exemplary smartphone listener 134*n* and/or the notebook listener 134*a* depicted in FIG. 3, provided the listener properties 102 for these listeners comply with the distance restriction and any publication criteria.

Pinned and Traveling Assets

The publication request 130 can include references to one or more assets being shared by a publisher user, a publication location, and a distance restriction. According to embodiments, the publication locations of assets being shared is a function of the assets being marked by a publisher user as 'pinned' or 'traveling' (i.e., non-pinned) assets. A pinned asset is an asset, such as a document, whose publication location is pinned to a given location. For example, the publication location for one or more pinned assets identified in publication request 130 can be a fixed geographic location selected by the publisher user. According to this embodiment, the publication location is 'pinned' to that fixed, set location. For example, if a publication request 130 indicates that an asset to be shared is pinned, the publication location for that asset can be pinned to a set location supplied by the publisher user. The pinned location can be selected via a publisher user interface (UI) rendered on display device 221. For example, a publisher user can select, via interaction with a publisher UI, a street address, a geographic coordinate (i.e., a latitude and longitude), or another geographic location as the publication location for a pinned asset. Non-limiting examples of pinned assets include menus pinned to restaurant locations, brochures pinned to trade show locations, and documents tied to exhibit hall locations such as exhibit halls in museums or convention centers.

A traveling asset is an asset whose publication location is not fixed and is instead based on a geographic location of a publisher. In an embodiment, the publication location for a traveling asset is a geographic location of publisher 234. The geographic location of publisher 234 can be obtained from a location service or a geographic information system (GIS). According to an embodiment, the publication location for a traveling asset can be initially set to the GPS location of publisher 234 at the time in timeline 342 when publication request 130 for the asset is sent. In certain embodiments, the publication locations of traveling assets can change as the GPS location of publisher 234 changes and be periodically updated at server system 104 at different points in timeline 342. Traveling assets can include, but are not limited to, electronic business cards, contract documents, exams, quizzes and other documents for educational institutions, and other assets that are shared on an as needed basis in non-static locations. In cases where security is paramount, such as a take home exam to be shared only with registered students in a course or a contract to be shared only with parties to the contract, a publisher user can restrict access to published assets by including additional publication criterion in publication request 130. For example, a published asset 132 will not be shared with unauthorized listeners if its corresponding publication request 130 included publication criteria restricting access to certain users and/or groups.

Distance Restrictions

In certain embodiments, a distance restriction is a radius around the publication location. The radius can be selected by the publisher using a UI (see, e.g., exemplary UI 500 in FIG. 5) and submitted with a publication request 130. According to these embodiments, the distance restriction will prevent access to an asset from listeners located outside the radius. In one such embodiment, the radius can define a horizontal circle on an X-Y plane in two-dimensional (2D) space around the publication location outside the circle (i.e., beyond the radius selected by the publisher). According to this embodiment, the distance restriction is evaluated in terms of a circle whose center is the publication location. For example, a radius of 1 mile can be specified by a publisher to restrict access to listeners within 1 mile of a publication location, where distance of a listener from the publication location is calculated as a physical distance between the geographic location of the listener and the publication location.

In another embodiment, the radius can define a sphere around the publication location. According to this embodiment, the distance restriction is expressed as a radius of a sphere whose center is the publication location so that a published asset 132 can be shared with listeners located within the sphere, including listeners above and below the publication location. For example, a radius of 50 feet can be specified to restrict access to listeners within 50 feet of a publication location, including listeners in within the 50-foot radius in any direction from the publication location. In this example, a listener 134*a* on an adjacent floor above or below the publication location may access a published asset 132, provided the listener is within 50 feet of the publication location. Whether the radius is used to define a circle or a sphere around a publication location, in cases where a publisher does not want to enforce a distance restriction, the publisher can select an extremely large value (i.e., approaching infinity) for the radius. As described below with reference to the exemplary user interface (UI) shown in FIG. 5, various radius values, including values nearing infinity, can be selected via a slider UI element.

In alternative embodiments, the distance restriction can be defined as an area having a set of coordinates. According to these embodiments, the set of coordinates can be used to determine whether a listener location included in listener properties 102 is within the area defined or bound by the coordinates, and thus allowed to access a published asset 132. For example, the set of coordinates can define a polygon, a set of control points for a closed curve, or a non-spherical, three-dimensional (3D) shape. The coordinates for the distance restriction can be selected to define a polygon or shape correlating to footprint of a building, a classroom, an exhibit hall, a campus, and/or certain floors of a building. In an embodiment, the distance restriction is expressed as coordinates defining the area in which an asset will be available. The coordinates can be specified in the publication request 130 when the asset is uploaded to server system 104. Alternatively, the distance restriction can be expressed as an area or shape such as a 2D or 3D shape. The area or shape can be defined in terms of boundaries and dimensions with the publication location being inside the area or shape. Dimensions and boundary locations for the area can be identified in the publication request 130. According to one embodiment, a publisher UI includes a map-based UI rendered on display device 221 so that a publisher can select coordinate points and visualize an area boundary defined by the coordinates before selecting the distance restriction and sending the distance restriction to server system 104 with publication request 130. For example, the distance restriction can be based on boundaries of defined areas of real property such as a campus, office complex, apartment complex, or housing subdivision. The distance restriction can also be expressed in terms of boundaries defining one or more shapes corresponding to time zones, geographic regions, congressional districts, postal/zip codes, counties, provinces, states, countries, city quadrants or wards, blocks, and other political subdivisions. Depending on the type of area or shape, the distance restriction may be expressed as boundaries of a polygon, points along parametric curves such as a Bézier curve, or a B-spline curve. The distance restriction can be sent to the server system 104 with publication request 130 as all coordinate points needed to define the boundary. In some cases, a margin of error for a distance restriction can be specified so that a listener 134 having a listener location (i.e., a geo-location) is deemed to satisfy the distance restriction requirement if the listener location is in an area defined by the distance restriction given allowances for the specified margin of error. In embodiments, distance calculations and determining whether a given listener satisfies the distance restriction can be performed by the criteria checker 216 described above with reference to FIG. 1.

Upon receiving publication request 130, server system 104 creates and stores a corresponding publication in a data store accessible by server system 104. For example, the publication can be stored in asset storage 110 together with copies of published assets 132 covered by the publication. In embodiments, publications are stored separately from asset storage 110. According to these embodiments, each publication includes references to one or more assets being shared by a publisher 234, a publication location for the assets, a distance restriction for the assets and one or more of information identifying the publisher 234 and other publication criteria. Examples of other publication criteria are discussed in the following paragraph. The references uniquely identify each of the one or more shared assets. For example, respective ones of the references can be one or more of a network location and a uniform resource locator (URL) of each published asset 132 included in the publication. In one embodiment, published assets 132 that are part of a publication have the same publication location and a common set of publication criteria, including the distance restriction.

Other Publication Criteria

Besides a distance restriction, a publisher can optionally specify other publication criteria when submitting a publication request 130. One example of such publication criteria include time criteria, which can indicate one or more of a duration, a timeout, an expiration date, and an expiration time for the publication. Non-limiting examples of such time criteria include a particular expiration date (i.e., a calendar date), a specified expiration time (i.e., a time of day in hours, minutes and seconds), and a duration (i.e., an increment of time). For such time criteria, a published asset 132 will only be provided to a listener in response to an asset request 136 if the expiration date, the expiration time, or the duration has not passed. Other exemplary time criteria can include time ranges. Such time ranges can be selected to coincide with academic periods (i.e., class/lecture times, exam periods, semesters, or school years), conference dates, and/or business schedules. For example, a publisher can indicate, in a publication request 130 that a given asset is only to be shared with listeners for a range of hours (i.e., 9 AM-6 PM), a range of days (i.e., Monday-Friday each week), certain weeks (i.e., the first week of each month), or months. Other time criteria can indicate a timeout. For example, a publication covering one or more published assets 132 can be designated with a timeout so that after the timeout has elapsed, the one or more published assets 132 are no longer available for download or viewing at listeners 134. Timeouts can be used as publication criteria for time-sensitive and time-constrained assets such as, for example, examinations being shared with students in a classroom location, coupons, deal-of-the-day offers, daily specials on menus, and other time-sensitive assets, specials, and promotions.

Besides a distance restriction and time criteria, other publication criteria can include an access control list, a publisher-designated list of approved listener users, or a list of approved listeners 134. For example, a publisher user can designate an approver list or access control list as other publication criteria in a publication request 130. An exemplary approver list from publisher 234 can designate registered listener users as being eligible or authorized to download a published asset 132 covered by a publication. The approver list can be initially established in a publication request 130 and subsequently updated via communications between publisher 234 and server system 104. The approver list can be used in environments where a finite set of registered listener users is known, such as in classrooms, training materials or other electronic content available to registered members of an organization or entity, and events, meetings, and conferences with registered attendees. Exemplary control lists include rules for restricting asset access to one or more registered users and/or predefined groups. Such registered users and predefined groups can be selected from groups and users in the user and group repository 122. An initial list of users and groups authorized to access an asset can be selected at time in timeline 342 when the publication request 130 is sent to server system 104. In one embodiment, one or more users can be selected via a publisher UI rendered on display device 221 of publisher 234. According to this embodiment, the selected users are authorized to access the asset once it is published, provided the distance restriction and any other publication criteria included in the publication request 130 are satisfied.

In accordance with certain embodiments, other publication criteria can include access privileges for published assets 132. For example, access privileges such as read (i.e., read-only), write (i.e., read-write or modify), execute, and republish can be indicated for published assets 132. A listener 134 receiving a published asset 132 having a read access privilege will be able to view, but not modify the published asset 132. If the listener 132 downloads a published asset 132 having a write privilege, the downloaded copy of the published asset 132 can be edited or otherwise modified locally on listener 134. In such cases, the copy of the published asset 132 stored in asset storage 110 will not be modified. However, the listener 132 may be able to publish the edited asset by submitting their own publication request 130 (i.e., by functioning as a publisher 234). If a published asset 132 is an executable asset such as, for example, a software application or script, and the asset has an execute access privilege, the asset can be executed (i.e., run) on listener 134. Lastly, if a published asset 132 has a republish access privilege, it can be republished by listener 134 using the listener location as the publication location instead of the original publication location.

Exemplary Asset Access Sequence

After the publication request 130 is received and processed by server system 104, listener 134n can submit an asset request 136 for a published asset 132. Next, server system 104 evaluates listener properties 102 previously obtained from listener 134n against the publication criteria received with the prior publication request 130 to determine if listener 134n is eligible to receive the published asset 132. For example, server system 104 can determine to provide the published asset 132 in response to the asset request 136 based on a listener location indicated in listener properties 102 (i.e., a requesting location associated with listener 134n and asset request 136), the publication location for the published asset 132, and the distance restriction indicated in the publication request 130, wherein according to the distance restriction, the published asset 132 is only provided to listener 134n if a distance from the listener's location (i.e., requesting location) to the publication location satisfies a specified relationship. In one embodiment, this evaluation is performed by the criteria checker 216. Before providing published asset 132 to listener 134n, the server system 104 determines whether to provide the published asset 132 in response to asset request 136. The determining is based on the listener location included in listener properties 102 (i.e., the requesting location), the publication location, the distance restriction, and any other publication criteria specified for the publication. Next, if the server system 104 determines that the distance from the requesting location to the publication location satisfies the relationship specified in the distance restriction and that listener properties 102 satisfy any other publication criteria, server system 104 provides the published asset 132 to listener 134n.

In certain embodiments where encryption of an asset was performed to produce an encrypted copy of the asset, such as encryption performed by an encryption module executing on publisher 234, the published asset 132 is stored in encrypted form in asset storage 110. According to these embodiments, a decryption key usable to subsequently decrypt the encrypted asset will be available to authorized listeners 134. The decryption key may be generated by the publisher 234 and optionally encrypted to produce an encrypted key before being transmitted to a listener 134 via server system 104 and network 206.

Exemplary Asset-Listener Association Sequence

With continued reference to FIG. 3, an exemplary sequence of messages to create an asset-listener association is initiated when an asset association request 135 is sent from a listener 134a (denoted as a notebook listener in the example of FIG. 3) to the server system 104. The asset association request 135 can indicate that a particular listener 134a wishes to be associated with published assets 132 that may be available to that listener 134a. Unlike an asset request 136, an asset association request 135 is not a request to download, view or otherwise access a particular published asset 132. Instead, the asset association request 135 merely indicates that listener 134a wishes to be associated with one or more published assets 132. Such an association can expedite subsequent access to the published assets 132 and can be conceptualized as a request to subscribe to a publication. In an embodiment, an association or linkage between a given asset and a listener 134a is made only when a publisher 234 grants (i.e., approves) an association approval request 338 indicating the desired asset-listener association. In the example of FIG. 3, the association approval request 338 corresponds to the asset association request 135 sent from listener 134a. In an embodiment, a publisher UI on publisher 234 prompts the publisher user to approve (or deny) the requested association. The prompt can identify the listener 134a and the asset listener 134a wishes to be associated with. If the association indicated in association approval request 338 is approved by a publisher user associated with publisher 234, a publisher acceptance 340 is sent from publisher 234 to server system 104. In response to receiving the publisher acceptance 340, server system 104 creates an asset-listener association 225a.

After the asset-listener association has been performed as a result of asset association request 135, association approval request 338, and publisher acceptance 340, an association confirmation 344 can be provided to the listener 134a to notify a user that an association between a published asset 132 and the listener 134a has been created. As shown, an asset-listener association 225a created as a result of a message exchange between listener 134a, the server system 104, and the publisher 234 can be saved as a record in the associations database 114. In the example of FIG. 3, an association confirmation 344 is sent from the server system 104 to the listener 134a after a record for the asset-listener association 225a has been created in the associations database 114. Once an association between a listener 134 and a published asset 132 is made, the asset-listener association 225 persists until revoked by the publisher 234 or a time criteria specified by the publisher for the corresponding publication expires. For example, in cases where publication criteria for a published asset 132 include time criteria, any asset-listener associations 225 for that published asset 132 can be removed from the associations database 114 if the time criteria have expired. Non-limiting examples of such time criteria include a duration and an expiration date or time. Asset-listener associations 225 for a published asset 132 having such time criteria can be deleted if the expiration date, expiration time, or duration for the corresponding publication has passed.

In an embodiment, publisher 234 can revoke an asset-listener association by sending a revocation message (not shown) at some time in timeline 342 subsequent to the publication request 130. The cloud hosted service honors the revocation of a previously established asset-listener association 225 for any published asset 132 uploaded from and published by publisher 234. According to embodiments, such revocation can be honored by deleting asset-listener associations 225 for the published asset 132 from associations database 114 and/or by marking asset-listener associations 225 as revoked. The cloud-hosted service also honors time-based expirations of asset-listener associations 225. In example embodiments, if the publication request 130 for a given asset includes time criteria, such as an expiration time, date, or duration for a publication, upon expiration or passage of the time criteria, any asset-listener associations 225 for the corresponding published asset 132 are deleted from associations database 114. In alternative embodiments, if a time criteria for a publication has expired or elapsed, asset-listener associations 225 for the corresponding published asset 132 can be marked as expired in associations database 114.

Exemplary Asset Sharing Data Flows

Figure 4:
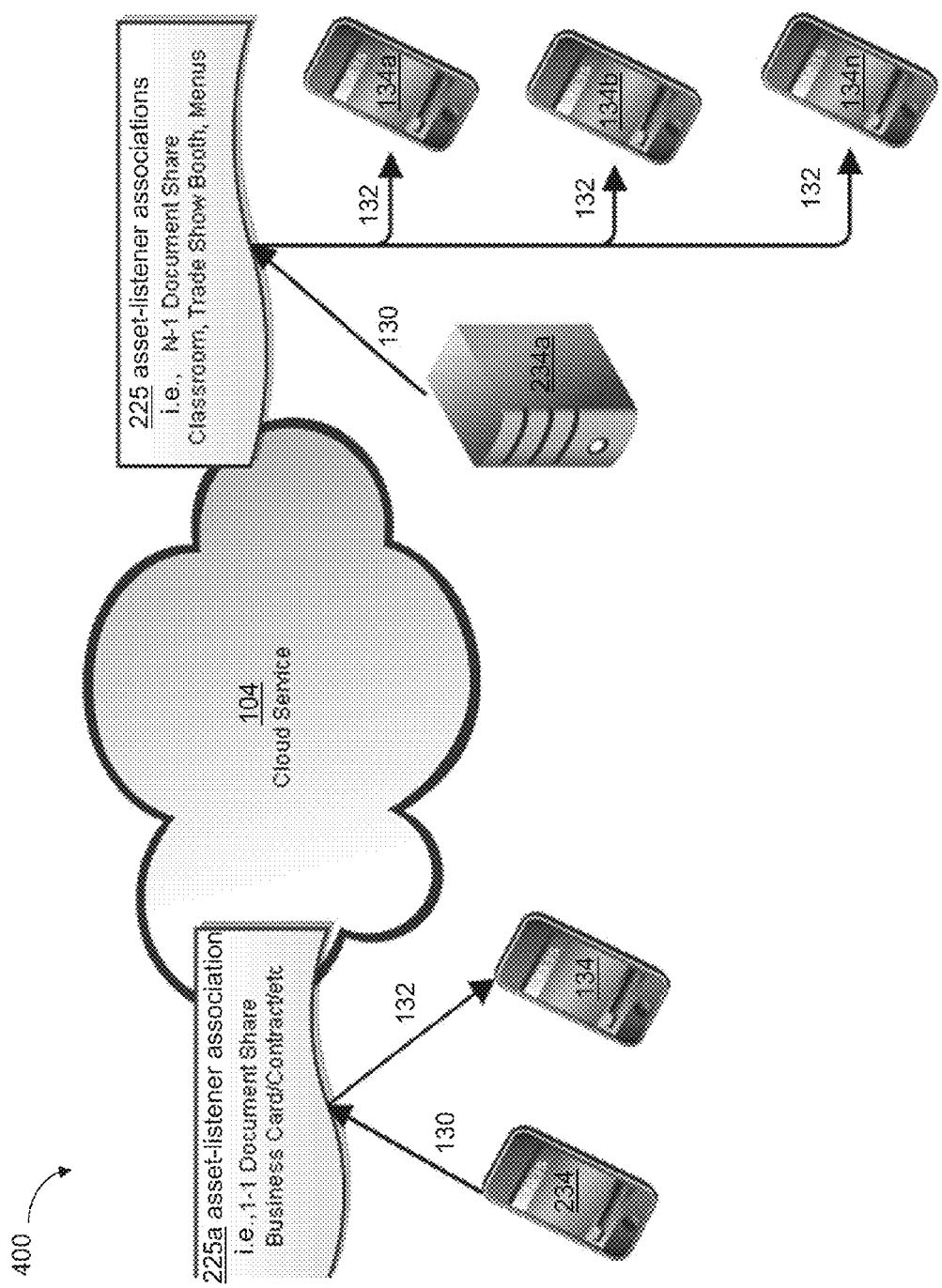
FIG. 4 is a diagram depicting data flows among publishers sharing assets and listener devices accessing the shared assets, in accordance with embodiments.

FIG. 4 is a diagram depicting data flows among publishers sharing assets and listener devices accessing the shared assets. In particular, FIG. 4 depicts high-level data flows 400 for sharing a published asset 132 between a publisher 234 and a single listener 134, and for sharing a published asset 132 between a publisher 234a and multiple listeners 134a-n. The data flows 400 in FIG. 4 are described with reference to the embodiments of FIGS. 1-3. However, the data flows for asset sharing are not limited to those example embodiments.

As shown in FIG. 4, after sending a publication request 130 to server system 104 hosting a cloud service, publisher 234 can share a published asset 132 with a particular listener 134. In the example of FIG. 4, asset-listener association 225a is created in associations database 114 for the 1-1 match between published asset 132 and listener 134. As depicted in FIG. 4, such a 1-1 asset-listener association 225a can be used in cases where publisher 234 wishes to share a published asset 132, such as an electronic business card or contract, exclusively with listener 134 and not a wider audience. This 1-1 asset-listener association 225a can be established implicitly between publisher 234 and listener 134 by indicating a tight (i.e., immediate proximity) distance restriction such as, for example, a 3 foot radius, in cases where publisher 234 is within the immediate proximity of listener 134. Additionally or alternatively, the 1-1 asset-listener association 225a can be established explicitly by including a control list in the publication criteria sent with publication request 130 that restricts access to published asset 132 to a particular registered listener user associated with listener 134.

With continued reference to FIG. 4, another publisher 234a can send a publication request 130 to server system 104 in order to share a published asset 132 with a plurality of listeners 134a-n. In this case, multiple asset-listener associations 225 are created in associations database 114 for matches between published asset 132 from publisher 234a and each of listeners 134a-n. As shown, such a one-to-many relationship between a single publisher 234a and multiple listeners 134a-n can be used in environments such as classrooms, meeting rooms, trade show booths and/or in cases where the published asset 132 is to be shared with multiple listeners 134a-n, such as a restaurant menu being shared with diners and potential customers in and near a restaurant location. Asset-listener associations 225 can be established implicitly between publisher 234a and listeners 134a-n by indicating a broader (i.e., immediate surroundings) distance restriction such as, for example, a 10 meter radius, in cases where listeners 134a-n are expected to be within the immediate surroundings of publisher 234a. Additionally or alternatively, an N-1 listener-asset association can be saved in associations database 114 and established explicitly by including a control list in the publication criteria sent with publication request 130 that allows access to published asset 132 to a list of registered listener users or groups associated with listeners 134a-n.

Exemplary User Interface

Figure 5:
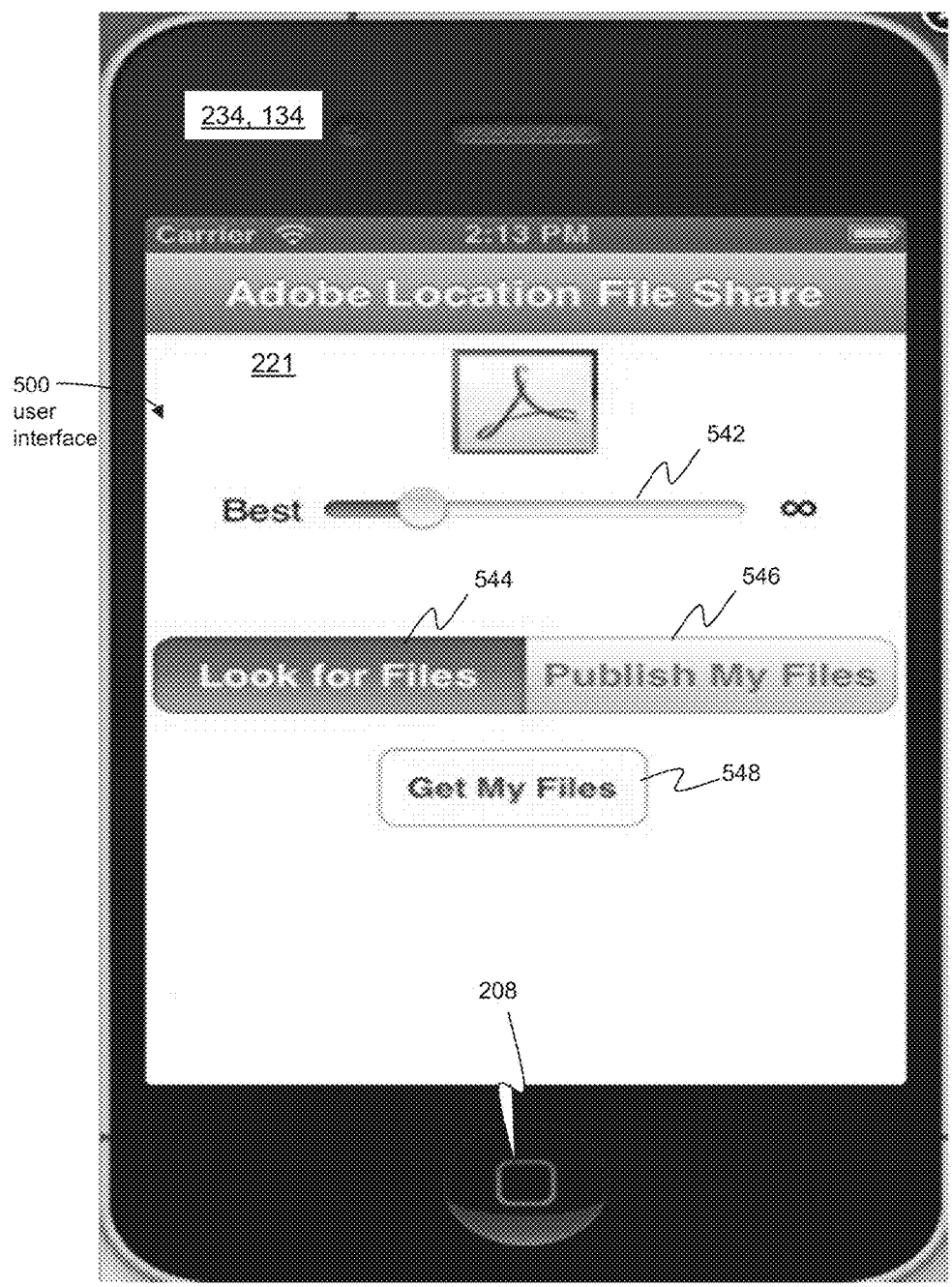
FIGS. 5-7 illustrate example user interfaces for a location-based asset sharing application, in accordance with embodiments.
Figure 6:
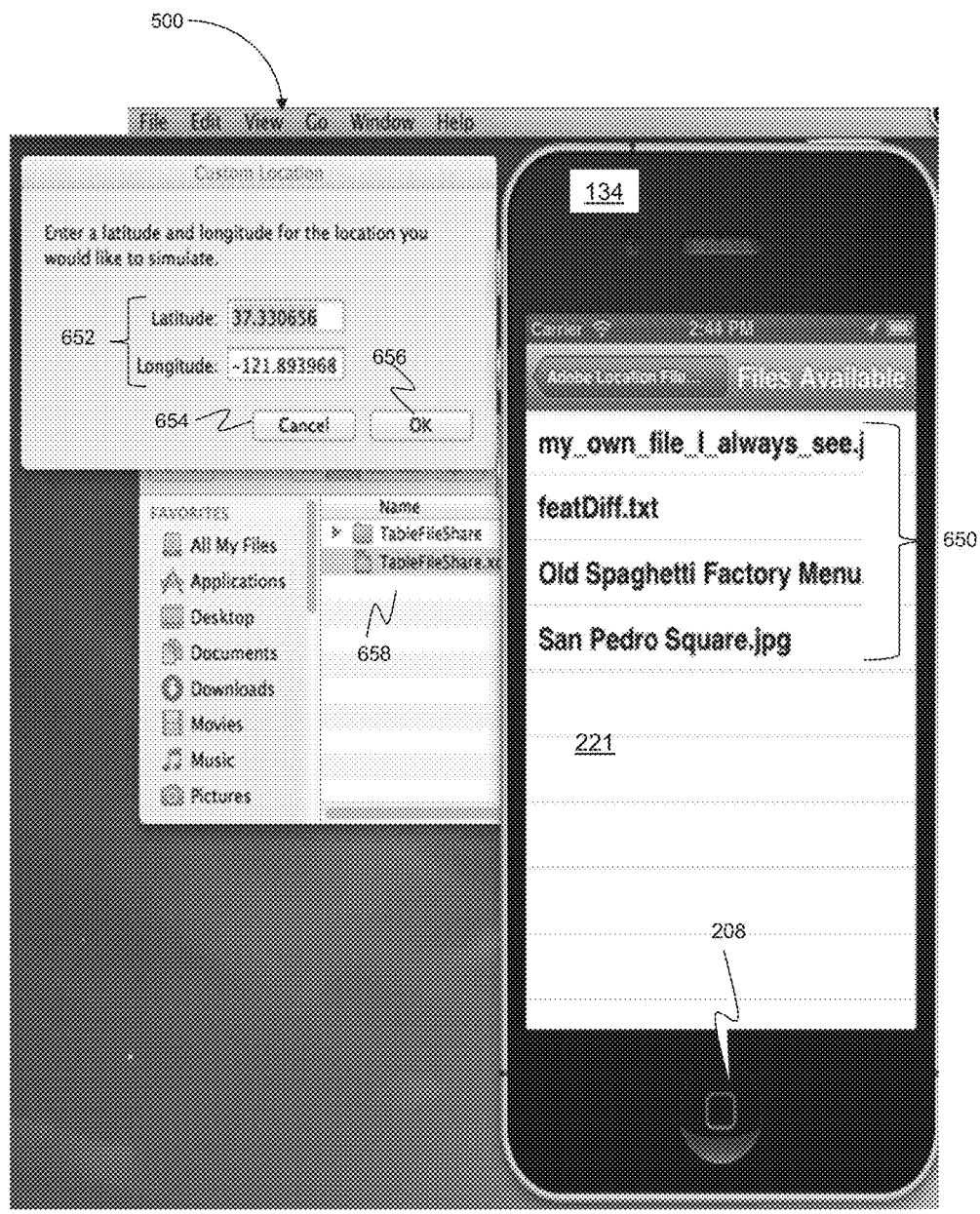
Figure 7:
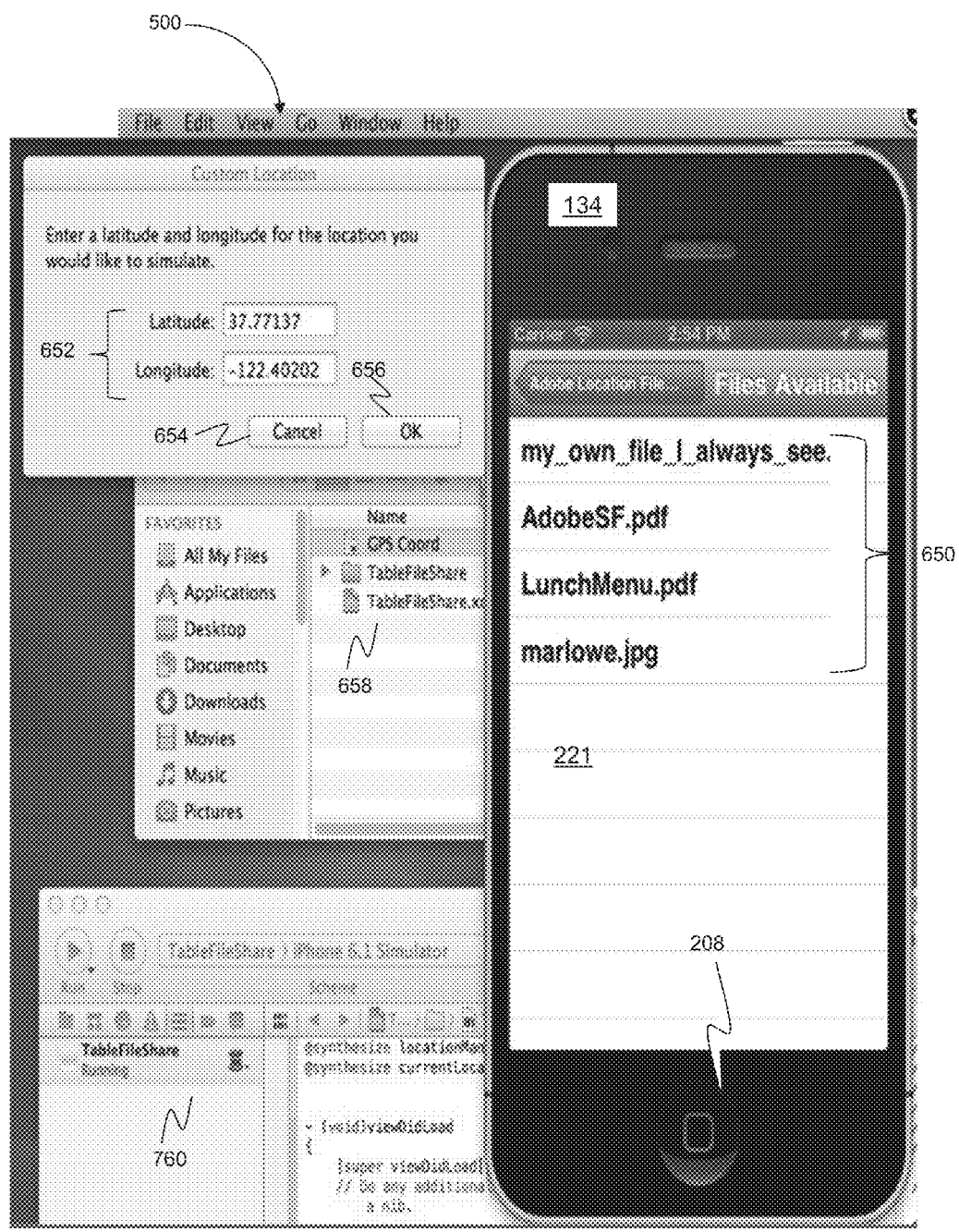

FIGS. 5-7 illustrate a user interface (UI), according to embodiments of the present disclosure. The UI depicted in FIGS. 5-7 are described with reference to the embodiments of FIGS. 1-4. However, the UI is not limited to those example embodiments. In an embodiment, the interfaces for publisher and listener client applications are displayed on publisher 234 and listeners 134a-n which each have a respective display device, namely 221 and 221a-n. For ease of explanation, the publishing operations discussed in FIGS. 5-7 are in the context of a client application executing on a smartphone publisher 234 with a touch sensitive (i.e., touch screen) device 221, and the asset request operations are discussed in the context of a listener client application executing on a smartphone listener 134 with a touch-screen display device 221. However, the publishing and asset sharing operations are not intended to be limited to the exemplary device and platform shown in FIGS. 5-7. Non-limiting examples of operating systems and platforms having touch sensitive surfaces and screens include tablets and smartphones and running the iOS from Apple, Inc., the WINDOWS® Mobile OS from the MICROSOFT™ Corporation, the Windows® 8 OS from the MICROSOFT™ Corporation, the Android OS from Google Inc., the Blackberry OS from Research In Motion (RIM), and the Symbian OS. It is to be understood that the user interfaces illustrated in the exemplary embodiments of FIGS. 5-7 can be readily adapted to execute on displays of a variety of computing device platforms running a variety of operating systems that support an interactive user interface.

Throughout FIGS. 5-7, input devices and displays are shown with various buttons, slider elements, icons, command regions, dialog boxes, windows, toolbars, menus, and lists that are used to initiate action, invoke routines, publish assets, access published assets 132, or invoke other functionality. The initiated actions include, but are not limited to, selecting an asset to be shared and uploaded to asset storage 110, selecting publication criteria such as a distance restriction, selecting a range in which to look for published assets 132, selecting a published asset 132 to download and view, and other asset sharing-related inputs and gestures. For brevity, only the differences occurring within the figures, as compared to previous or subsequent ones of the figures, are described below.

In embodiments, the display device 221 used to display the user interfaces shown in FIGS. 5-7 may be displayed via the display interface 902 and the computer display 930 described below with reference to FIG. 9. According to embodiments, a user can interact with touch screen displays 221 using the exemplary input devices 208 shown in FIGS. 5-7. However, alternative and additional input devices can be used, such as a stylus, a finger, a mouse, a keyboard, a keypad, a joy stick, a voice activated control system, or other input devices used to provide interaction between a user and the UI shown in FIGS. 5-7. As described below with reference to FIGS. 5-7, such interaction can be used to indicate an asset to be shared and uploaded to asset storage 110, to select a distance restriction for an asset to be published, to navigate through multiple published assets 132 previously uploaded to a server system 104 hosting a cloud service, and to select a published asset 132 for downloading and viewing on a listener 134.

FIG. 5 illustrates how an exemplary UI 500 can be used to interact with display device 221 of a publisher 234 to publish an asset, select a distance restriction so that the published asset 132 is available via a subsequent asset request 136 at a listener 134. FIG. 5 shows an embodiment where a publish assets button 546 (labeled 'Publish My Files' in the example of FIG. 5) can be used in conjunction with slider 542 to publish one or more assets. In an embodiment, slider 542 is used to designate a distance restriction for a publication request 130. As shown, slider 542 allows a publisher user to vary the distance restriction from a 'Best' surrounding setting to infinity (i.e., no distance restriction). According to one embodiment, the Best surrounding setting is a preset, tunable radius (i.e., 3 feet) and the midpoint of slider 542 is an immediate surrounding setting (i.e., a 10 meter radius). If the infinity setting is selected using slider 542, the publication request 130 generated using UI 500 will be available to listeners 134 located anywhere in relation to the publication location (i.e., there will not be a distance restriction). It is to be understood that even for publications without a distance restriction, other publication criteria, such as, for example, time criteria and/or an access control list, can be used to restrict access to a published asset 132. For example, UI 500 can include additional UI elements and objects (not shown) usable to enter other publication criteria besides a distance restriction. Such publication criteria can include time criteria indicating when a publisher user wishes to share an asset, and access restrictions indicating whom the publisher user wants to share the asset with. The publication criteria includes a publication location. In embodiments, the UI 500 allows the publisher user to either set a fixed publication location for an asset by pinning the asset to a specific geographic location, or use the geographic location of the publisher 234 as the publication location. For example, the publication location can supplied to the server system 104 as the publisher device's GPS location from a location service or a GIS, where the GPS location is determined at the time the asset is uploaded to the server system 104.

UI 500 also includes a look for assets button 544 (labeled 'Look for Files' in the example of FIG. 5). By selecting look for assets button 544, a user can start a listener process and activate the device shown in FIG. 5 as a listener 134. At this point, listener properties 102 will be sent from the listener 134 to a server system 104 hosting a location-based asset sharing cloud service. A get assets button 548 (labeled 'Get My Files' in the example of FIG. 5) can be used together with slider 542 to designate a GPS range usable by server system 104 to identify published assets 132 that are available to listener 134 that have publication locations within the range. Based on the GPS range selected using slider 542, the listener location, and publication locations for assets, the server system 104 can identify published assets 132 the listener 134 is eligible to access (i.e., assets available to be downloaded or viewed via UI 500). In an embodiment, slider 542 is selectable to increase or decrease the GPS range in a similar manner as described above with regard to the distance restriction.

As shown in FIGS. 6 and 7, after get assets button 548 is selected, listener 134 receives and displays a list 650 of published assets 132 within the GPS range that are available from the server system 104. The list 650 can include asset names and selectable links or references to the available, published assets 132 that are within the geo-location range designated at listener 134 using slider 542. In response to receiving a selection of an asset in the list (i.e., a selection of a link to an asset), listener 134 downloads and renders the asset on display device 221 via UI 500. In an embodiment, the list 650 is also based on designated distance restrictions and other publication criteria for published assets 132. As described above with reference to FIG. 5, such distance restrictions can be selected using slider 542 when publish assets button 546 has been selected.

As seen in FIGS. 6 and 7, a specific location to look for published assets 132 can be set by entering coordinates 652 in a custom location dialog box. In the non-limiting examples of FIGS. 6 and 7, coordinates 652 are latitude and longitude coordinates expressed in degrees, minutes and seconds. The coordinates 652 can be a custom location differing from a current GPS location of listener 134 and a previously reported listener location sent with listener properties 102 to server system 104. Cancel button 654 can be used to cancel entry or selection of specific coordinates 652 and OK button 656 can be used to look for published assets 132 within the GPS range of coordinates 652. Although FIGS. 6 and 7 are shown in the context of a listener 134, a similar interface can be used to select a fixed location to pin published assets 132 to. For example, when a publisher user wishes to pin a publication to specific coordinates 652, the interface shown in FIGS. 6 and 7 can be used to enter the coordinates 652 as the fixed, pinned publication location sent with a publication request 130 to server system 104.

FIGS. 6 and 7 also show that an exemplary navigation window 658 including a geo-location (labeled 'GPS coord' in the examples of FIGS. 6 and 7) and a table of published assets 132 available to the geo-location (denoted as a TableFileShare in FIGS. 6 and 7) can be displayed in a window of UI 500. The navigation window 658 can include a selectable icon or folder that can be expanded to simulate the list asset-listener associations 225 matching listener 134 should the listener 134 have a geo-location matching a given GPS coordinate. For example, when expanded in UI 500, navigation window 658 can display contents of a table or list including any asset-listener associations 225 from associations database 114 that would be matched to listener 134 in the event the listener's geo-location were to change to a specified GPS coordinate.

FIG. 7 shows that upon changing coordinates 652 and selecting OK button 656, list 650 is dynamically updated to indicate different published assets 132 that are within the GPS range of the changed coordinates 652. FIG. 7 additionally shows that by selecting the table of published assets 132 in navigation window 658, an embodiment of UI 500 can display a management window 760. The exemplary management window 760 includes a status pane displaying the status (i.e., running or halted) of a listener process, button controls selectable to stop and start a listener process on listener 134, and an editing pane for manually editing settings of the listener process. In embodiments, navigation window 658 and management window 760 may be available to developer and administrator users who wish to simulate a given geo-location or modify properties of a listener process.

Exemplary Method for Location-Based Asset Sharing

Figure 8:
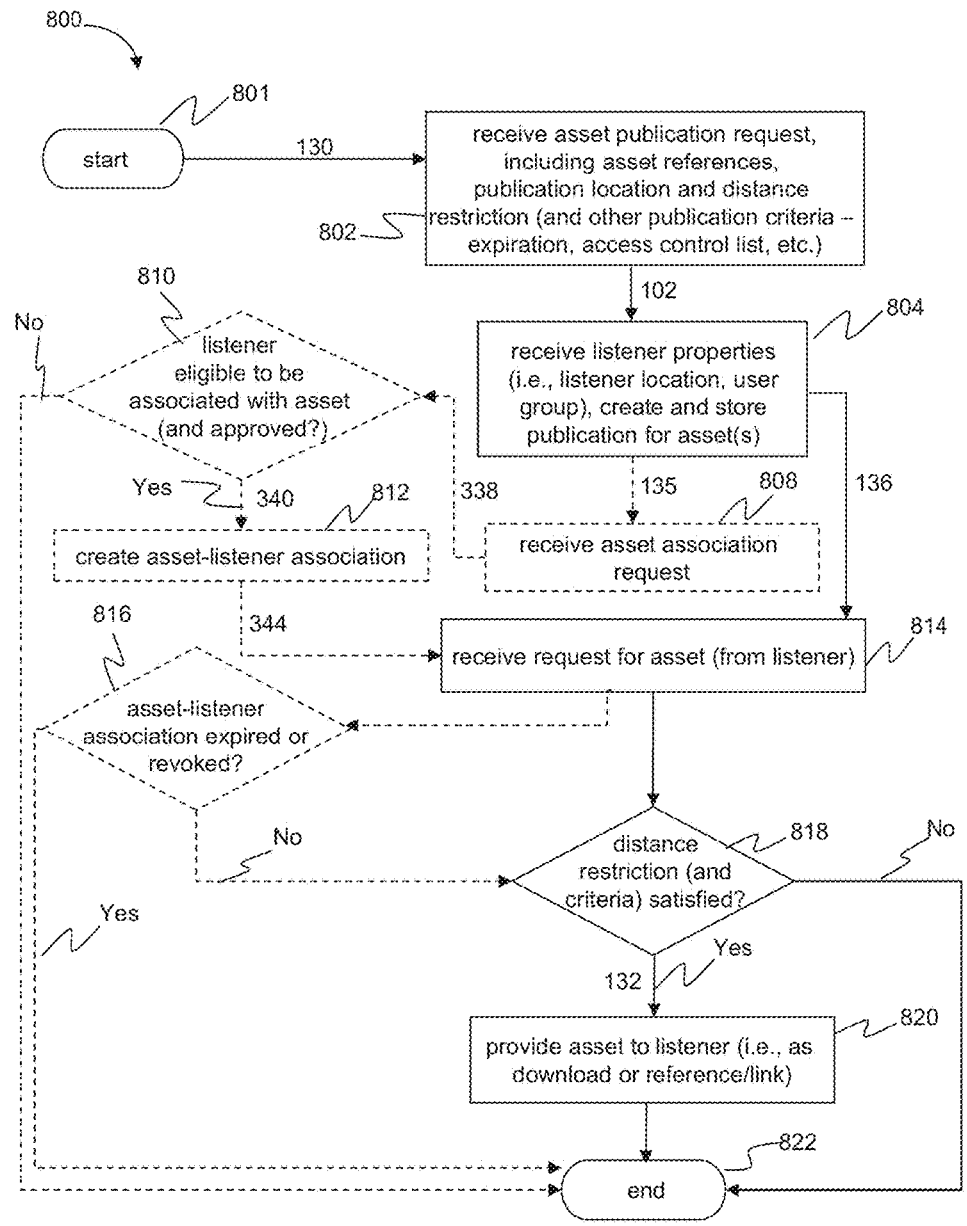
FIG. 8 is a flow chart illustrating an exemplary method for sharing assets based on location, in accordance with embodiments.

FIG. 8 is a flow chart illustrating an example method 800 for publishing and accessing assets using a server-hosted cloud service. For illustrative purposes, the method 800 is described with reference to the architecture and system implementations depicted in FIGS. 1 and 2, the data/communication flows depicted in FIGS. 3 and 4, and the user interfaces illustrated in FIGS. 5-7. Other implementations, however, are possible. Optional portions of steps are indicated in the flowchart by dashed lines and parenthetical phrases (see, e.g., steps 802, 808, 810, 812, and 816).

The method 800 begins in step 801 where a publication request 130 is transmitted and proceeds to step 802, where the publication request 130 is received. Step 801 can be initiated at a publisher 234. Step 801 can be performed concurrently with or subsequently to an upload of assets to be shared. For example, step 801 can be preceded by uploads of one or more assets to be shared from a publisher 234 to a server system 104 hosting a location-based asset sharing cloud service. Alternatively, the assets can be uploaded to the server system 104 with the publication request 130. Step 802 can comprise receiving the publication request 130 at the server system 104. As shown in FIG. 8, step 802 can comprise receiving an asset publication request 130 including references to one or more assets to be shared, a publication location for the one or more assets, and a distance restriction. Step 802 can optionally include receiving other publication criteria, such as time criteria for an expiration date or time, an access control list of registered users and groups, or a list of approved listener users. After the publication request 130 is received, control is passed to step 804.

In step 804, listener properties are received and the publication is created and stored. This step can be performed in part by storing the publication data received in step 802 in a data store or repository accessible from server system 104. The data store can be hosted locally on server system 104. In an embodiment, the publication can be saved together with uploaded copies of the shared assets in asset storage 110 on the server system 104. As shown, listener properties 102 can be received in step 804. Although not needed to create and store the publication, listener properties 102 may be obtained by server system 104 from listeners 134 that are in communication with server system 104. As shown in FIG. 8, the listener properties can include a listener location (i.e., a GPS geo-location from a location service or a GIS), and identification of a listener user or group associated with a listener 134. After the publication is created and stored, the method 800 optionally proceeds to step 808 in cases where an asset association request 135 is received. Otherwise, method 800 proceeds to step 814.

In optional step 808, an asset association request 135 is received. As discussed above with reference to FIG. 3, step 808 can comprise receiving an asset association request 135 indicating that a particular listener 134 wishes to be associated with published assets 132 covered by a publication. The asset association request 135 received in this step indicates that a listener 134 wishes to be associated with one or more published assets 132. After the asset association request 135 is received, control is passed to step 810.

In optional step 810, a determination is made as to whether the listener 134 that submitted the asset association request 135 received in step 808 is eligible to be associated with a published asset 132. Step 810 can be performed by evaluating the received listener properties 102 for the listener 134 against publication criteria for the published asset 132 in question. As shown in FIG. 8, the determination in step 810 can be based in part on publisher approval of an association approval request 338. Such approval can come from a publisher 234 that sent the publication request 130 received in step 802. For example, step 810 can include sending an association approval request 338 to the publisher 234 where the association approval request 338 corresponds to the asset association request 135 received in step 808. In additional or alternative embodiments, depending on the publication criteria received in step 802 and listener properties 102 received in step 804, step 810 can be performed by invoking one or more of the matchmaker module 220, the criteria checker 216, and/or the authentication module 218 discussed above with reference to FIG. 2. If it is determined that the listener 134 is eligible to be associated with the published asset 132, control is passed to step 812. In cases where the determination is based in part on approval of an association approval request 338, a publisher acceptance 340 is generated. Otherwise, control is passed to step 822 where method 800 ends.

In optional step 812, an asset-listener association 225 between the published asset 132 and the listener 134 is created. Such an association can expedite subsequent access to the published asset 132 and can be conceptualized as a subscription to a publication. As part of step 812, a publisher acceptance 340 can be received from the publisher 234 that sent the publication request 130 received in step 802. Step 812 can comprise creating an asset-listener association 225 as a record in the associations database 114 in response to receiving a publisher acceptance 340 of the association indicated in association approval request 338.

As shown in FIG. 8, after the asset-listener association has been created as a result of asset association request 135, association approval request 338, and publisher acceptance 340, an association confirmation 344 can be created. The association confirmation 344 can be sent to the listener 134 to notify a listener user that an association between a published asset 132 and the listener 134 has been created.

Next, in step 814, an asset request 136 is received from a listener. This step can comprise receiving an asset request 136 triggered by an attempt to download, navigate to, or view a published asset 132 at a listener 134. After the asset request 136 is received, control is optionally passed to step 816 in cases where an asset-listener association exists for the requested asset. Otherwise, control is passed to step 818.

In optional step 816, a determination is made as to whether a previously created asset-listener association between the requested asset and the requesting listener 134 has asset-listener expired, timed-out, or been revoked. The determination is based on evaluating the status of an asset-listener association linking the requested asset to a requesting listener 134. For example, if a publisher 234 subsequently revoked an asset-listener association 225 created in step 812, the requested asset will not be provided to the listener 134 and control is passed to step 822 where method 800 ends. Similarly, if an expiration date or time for an asset-listener association 225 has passed, or if a timeout duration for the asset-listener association 225 has elapsed, control is passed to step 822 without providing the requested asset to listener 134. Otherwise, if it is determined that the asset-listener association has not expired or been revoked, control is passed to step 818.

Next, in step 818, a determination is made as to whether the distance restriction and any other publication criteria are satisfied. For example, this step can comprise invoking one or more of the matchmaker module 220, the criteria checker 216, and/or the authentication module 218 to determine if the listener properties 102 of the requesting listener 134 satisfy the distance restriction and other publication criteria indicated in the publication for the requested asset. Step 818 can be performed by determining, by server system 104, whether to provide the requested asset based on the listener location in listener properties 102, the publication location, and the distance restriction, wherein according to the distance restriction, the requested asset is only provided to the requesting listener 134 if a distance from the listener location to the publication location satisfies a specified relationship. If it is determined that the distance restriction and any other publication criteria are satisfied, control is passed to step 820 where the published asset 132 is provided to the requesting listener 134. Otherwise, control is passed to step 822 where the method ends.

In step 820, the published asset 132 is provided to the requesting listener 134. As shown in FIG. 8, the published asset 132 can be provided via a download or as a reference such as a pointer or link. For example, the cloud service hosted by server system 104 can provide a reference, such as a URL, to the published asset 132. If the published asset 132 stored in step 810 was encrypted, the asset provided in step 820 will be in encrypted form. For example, if an encrypted copy of a published asset 132 was received from publisher 234 in step 810, that encrypted asset will be provided in step 820 to the listener 134. In such cases where the published asset 132 has been previously encrypted (i.e., by an encryption module on publisher 234) prior to receiving and storing an uploaded copy of published asset 132 in step 810, the listener 134 can invoke a decryption module to decrypt the downloaded published asset 132.

Exemplary Computer System Implementation

Figure 9:
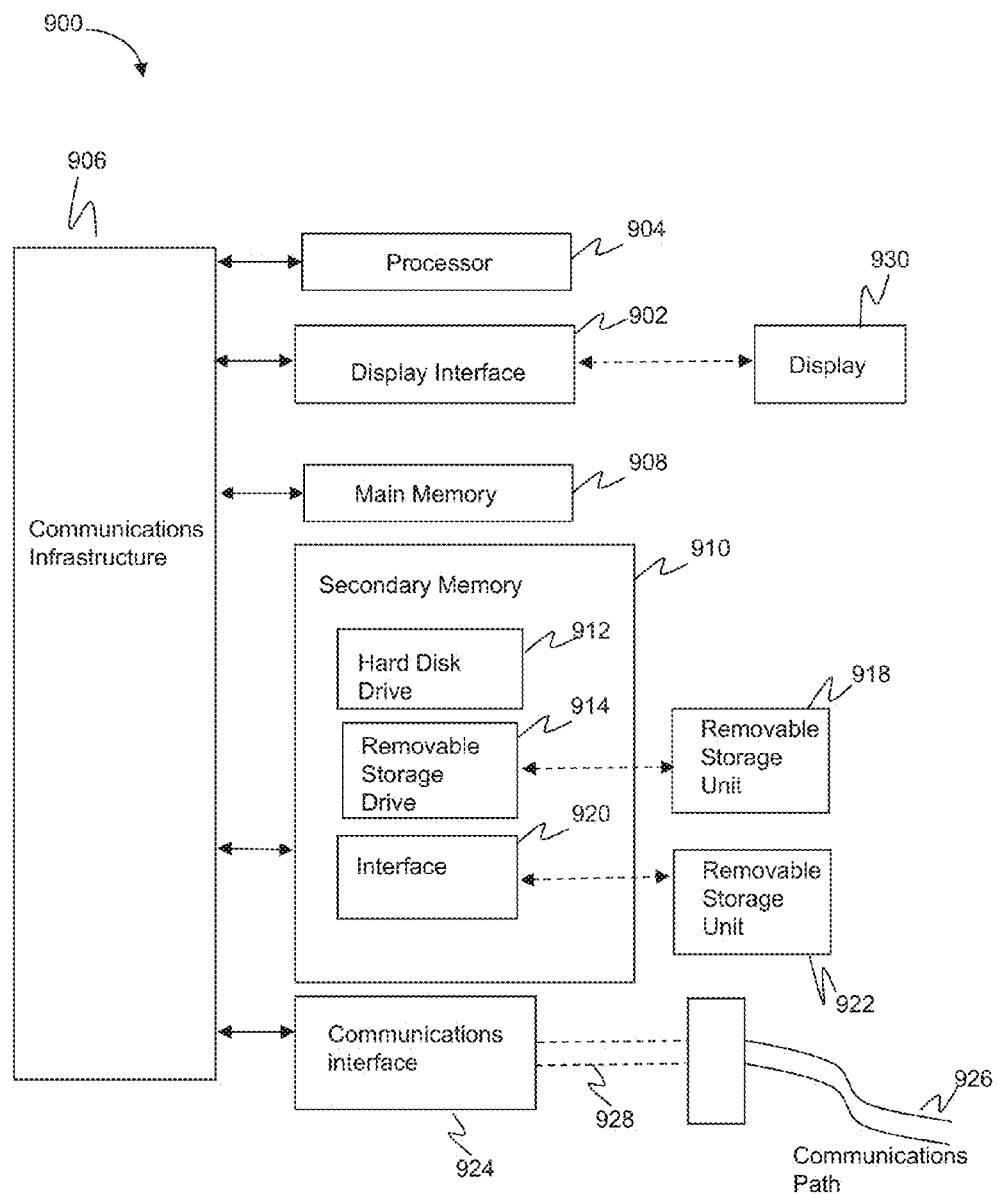
FIG. 9 is a diagram of an exemplary computer system in which embodiments of the present disclosure can be implemented.

Although exemplary embodiments have been described in terms of publisher and listener computing devices, server systems, and methods, it is contemplated that certain functionality described herein may be implemented in software on microprocessors, such as processors 223, 226 and 226*a-n* included in server system 104, publisher 234, and listeners 134*a-n* shown in FIG. 2 and computing devices such as the computer system 900 illustrated in FIG. 9. In various embodiments, one or more of the functions of the various components may be implemented in software that controls a computing device, such as computer system 900, which is described below with reference to FIG. 9.

Aspects of the present invention shown in FIGS. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by server system 104, publisher 234, listeners 134-*an* and their respective modules, applications, and user interfaces (UIs) shown in FIGS. 2 and 5-7 can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the method 800 illustrated by the flowcharts of FIG. 8 discussed above and the cloud service hosted by the server system 104 discussed above with reference to FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, one or more of the processors 223, 226 and 226*a-n* described above with reference to the server system 104, publisher 234, and listeners 134*a-n* of FIG. 2 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. In non-limiting embodiments, one or more of the memories 224, 228 and 228*a-n* described above with reference to the server system 104, publisher 234, and listeners 134*a-n* of FIG. 2 can be embodied as the main memory 908 shown in FIG. 9.

The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or EEPROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the steps in the method 800 illustrated by the flowchart of FIG. 8, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

In an embodiment, the display devices 221 and 221a-n used to display interfaces of publisher 234 and listeners 134a-n, respectively, may be a computer display 930 shown in FIG. 9. The computer display 930 of computer system 900 can be implemented as a touch sensitive display (i.e., a touch screen). Similarly, the user interfaces shown in FIGS. 5-7 may be embodied as a display interface 902 shown in FIG. 9.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method comprising:

storing a publication in a data store of a server having a processor and memory, the publication including a publication location and a distance restriction, the publication location comprising a geographic location of a publisher computing device, wherein the publication includes an asset and is stored in response to a publication request from the publisher computing device, wherein the publication request includes the distance restriction and identifies a user group:

receiving, at the server, from a listener computing device, an asset association request to access assets stored in the data store for the publisher computing device, wherein the asset association request from the listener computing device identifies the user group, wherein the distance restriction is a travelling distance restriction that changes with a change to the geographic location of the publisher computing device:

generating, at the server, an asset-listener association based on an authorization of the asset association request, the asset-listener association qualifying the listener computing device to access the assets;

receiving, at the server, from the listener computing device, a request for the asset associated with the publication, the request identifying the asset and indicating a requesting location representing a detected, geographic location of the listener computing device;

determining, at the server, that the listener computing device is eligible to access the asset based on the asset-listener association;

determining, by the server, a distance from the requesting location of the listener computing device to the publication location of the publisher computing device is within the distance restriction; and in response to determining that the distance is within the distance restriction and to determining that the listener computing device is eligible to access the asset, providing the asset to the listener computing device in response to the request.

* * * * *